United States Patent
Iyer et al.

(10) Patent No.: US 11,569,886 B2
(45) Date of Patent: Jan. 31, 2023

(54) NETWORK-SENSITIVE TRANSMIT DIVERSITY SCHEME

(71) Applicant: QUALCOMM Incorporated, San Diego, CA (US)

(72) Inventors: Sumant Jayaraman Iyer, San Diego, CA (US); Timo Ville Vintola, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/831,522

(22) Filed: Mar. 26, 2020

(65) Prior Publication Data
US 2020/0313738 A1   Oct. 1, 2020

Related U.S. Application Data

(60) Provisional application No. 62/827,644, filed on Apr. 1, 2019.

(51) Int. Cl.
*H04B 7/06* (2006.01)
(52) U.S. Cl.
CPC .................................. *H04B 7/063* (2013.01)
(58) Field of Classification Search
CPC ......... H04B 1/02; H04B 7/063; H04L 5/0048; H04M 1/00
See application file for complete search history.

(56) References Cited

U.S. PATENT DOCUMENTS

| | | | | |
|---|---|---|---|---|
| 4,853,839 A | * | 8/1989 | Nichols ................. | G01S 13/723 342/359 |
| 8,068,550 B2 | * | 11/2011 | Trachewsky ......... | H04B 7/0628 375/267 |
| 8,295,385 B2 | * | 10/2012 | Trachewsky ......... | H04B 7/0628 375/267 |

(Continued)

FOREIGN PATENT DOCUMENTS

| | | | |
|---|---|---|---|
| CN | 209238180 U | * | 8/2019 |
| KR | 2005075967 A | * | 7/2005 |

(Continued)

OTHER PUBLICATIONS

International Search Report and Written Opinion—PCT/US2020/025208—ISA/EPO—dated Aug. 6, 2020 (192108WO).

(Continued)

*Primary Examiner* — Berhanu Tadese
(74) *Attorney, Agent, or Firm* — Holland & Hart LLP

(57) ABSTRACT

Methods, systems, and devices for wireless communications are described. A transmitting device, which may be an example of a user equipment and/or a base station, may receive a signal from a receiving device indicating an antenna topology supported by the receiving device. The transmitting device may select, based at least in part on the antenna topology, a diversity scheme for performing a wireless transmission to the receiving device, the diversity scheme including one or more diversity types from a plurality of diversity types. The transmitting device may transmit the wireless transmission to the receiving device employing the selected diversity scheme.

27 Claims, 17 Drawing Sheets

(56) References Cited

U.S. PATENT DOCUMENTS

| | | | | |
|---|---|---|---|---|
| 8,467,363 B2* | 6/2013 | Lea | ............... | H01Q 25/001 455/562.1 |
| 8,548,095 B2* | 10/2013 | Park | ............... | H04B 7/0486 375/267 |
| 8,755,747 B2* | 6/2014 | Robinson | ............... | H04B 1/3805 370/335 |
| 8,824,442 B2* | 9/2014 | Lea | ............... | H04W 88/08 455/562.1 |
| 8,909,165 B2* | 12/2014 | Hendin | ............... | H04B 1/525 455/226.1 |
| 8,913,678 B2* | 12/2014 | Trachewsky | ............... | H04B 7/04 375/267 |
| 9,001,809 B2* | 4/2015 | Lea | ............... | H01Q 25/00 455/461 |
| 9,078,163 B2* | 7/2015 | Kim | ............... | H04W 72/0446 |
| 9,178,558 B2* | 11/2015 | Lea | ............... | H01Q 21/24 |
| 9,226,171 B2* | 12/2015 | Safavi | ............... | H04W 16/28 |
| 9,350,411 B2* | 5/2016 | Lea | ............... | H04W 88/08 |
| 9,577,700 B2* | 2/2017 | Lea | ............... | H01Q 25/005 |
| 9,608,331 B1* | 3/2017 | Rowson | ............... | H04B 1/3838 |
| 9,712,216 B2* | 7/2017 | Lea | ............... | H01Q 1/246 |
| 9,755,767 B2* | 9/2017 | Dayal | ............... | H04B 7/0413 |
| 9,794,814 B2* | 10/2017 | Kim | ............... | H04B 7/0486 |
| 9,918,195 B2* | 3/2018 | Malik | ............... | G01S 3/74 |
| 9,923,657 B2* | 3/2018 | Forenza | ............... | H04B 7/0452 |
| 9,973,246 B2* | 5/2018 | Forenza | ............... | H04B 7/0456 |
| 10,135,501 B2* | 11/2018 | Lea | ............... | H04L 27/2636 |
| 10,164,698 B2* | 12/2018 | Forenza | ............... | H04B 7/0452 |
| 10,194,346 B2* | 1/2019 | Forenza | ............... | H04W 28/0236 |
| 10,439,777 B2* | 10/2019 | Wernersson | ............... | H04W 72/04 |
| 10,547,358 B2* | 1/2020 | Forenza | ............... | H04B 7/024 |
| 10,720,969 B2* | 7/2020 | Lea | ............... | H04B 1/401 |
| 10,757,583 B2* | 8/2020 | Ly | ............... | H04B 7/0617 |
| 10,785,799 B2* | 9/2020 | Chendamarai Kannan | ............... | H04W 74/0816 |
| 10,812,202 B2* | 10/2020 | Nagaraja | ............... | H04L 5/005 |
| 10,848,225 B2* | 11/2020 | Forenza | ............... | H04B 7/0452 |
| 10,855,357 B2* | 12/2020 | Li | ............... | H04B 7/0626 |
| 11,031,991 B2* | 6/2021 | Ryu | ............... | H04B 7/0617 |
| 11,096,178 B2* | 8/2021 | Huang | ............... | H04W 72/1268 |
| 11,172,457 B2* | 11/2021 | Zhou | ............... | H04W 56/001 |
| 11,228,931 B2* | 1/2022 | Zhou | ............... | H04L 5/001 |
| 11,252,772 B2* | 2/2022 | Hosseini | ............... | H04L 5/001 |
| 11,258,575 B2* | 2/2022 | Abedini | ............... | H04B 7/0695 |
| 11,324,030 B2* | 5/2022 | Ly | ............... | H04W 72/085 |
| 2002/0193146 A1* | 12/2002 | Wallace | ............... | H04B 7/0697 455/562.1 |
| 2003/0148738 A1* | 8/2003 | Das | ............... | H04B 7/0654 455/562.1 |
| 2003/0148770 A1* | 8/2003 | Das | ............... | H04B 7/0636 455/455 |
| 2003/0215006 A1* | 11/2003 | Raghothaman | ............... | H04B 7/0639 375/220 |
| 2004/0097200 A1* | 5/2004 | Terry | ............... | H04B 7/0634 455/562.1 |
| 2004/0127257 A1* | 7/2004 | Raghothaman | ............... | H04B 7/0641 455/560 |
| 2005/0221875 A1* | 10/2005 | Grossman | ............... | H01Q 1/242 455/562.1 |
| 2006/0171482 A1* | 8/2006 | Trachewsky | ............... | H04B 7/04 375/267 |
| 2007/0041465 A1* | 2/2007 | Paulraj | ............... | H04B 7/0671 375/267 |
| 2007/0206687 A1* | 9/2007 | Ananth | ............... | H04L 27/2647 375/347 |
| 2008/0039030 A1* | 2/2008 | Khan | ............... | H04B 7/0617 455/101 |
| 2008/0192849 A1* | 8/2008 | Kim | ............... | H04L 1/06 375/260 |
| 2009/0034438 A1* | 2/2009 | Soulie | ............... | H04W 48/16 370/280 |
| 2009/0059884 A1* | 3/2009 | Zhang | ............... | H04L 5/0053 370/342 |
| 2009/0207093 A1* | 8/2009 | Anreddy | ............... | H04B 7/0805 343/893 |
| 2009/0268841 A1* | 10/2009 | Kim | ............... | H04B 7/18543 375/267 |
| 2010/0303004 A1* | 12/2010 | Mueck | ............... | H04L 1/1816 370/328 |
| 2011/0244912 A1* | 10/2011 | Filipovic | ............... | H04B 7/0443 455/522 |
| 2011/0255620 A1* | 10/2011 | Jones, IV | ............... | H04L 5/0046 375/260 |
| 2012/0027054 A1* | 2/2012 | Palanki | ............... | H04B 7/0857 375/211 |
| 2012/0039324 A1* | 2/2012 | Trachewsky | ............... | H04B 7/04 370/338 |
| 2012/0052821 A1* | 3/2012 | Jia | ............... | H04B 7/0857 455/90.2 |
| 2012/0069926 A1* | 3/2012 | Park | ............... | H04B 7/063 375/267 |
| 2012/0076100 A1* | 3/2012 | Noh | ............... | H04B 7/0684 370/329 |
| 2012/0087427 A1* | 4/2012 | Noh | ............... | H04L 27/2613 375/260 |
| 2012/0108186 A1* | 5/2012 | Goransson | ............... | H04B 7/0615 455/101 |
| 2012/0178501 A1* | 7/2012 | Jiang | ............... | H04B 7/0871 455/561 |
| 2012/0195224 A1* | 8/2012 | Kazmi | ............... | H04B 7/0623 370/252 |
| 2012/0328031 A1* | 12/2012 | Pajukoski | ............... | H04B 7/0469 375/259 |
| 2013/0016709 A1* | 1/2013 | Trachewsky | ............... | H04B 7/04 370/338 |
| 2013/0044028 A1* | 2/2013 | Lea | ............... | H01Q 21/064 342/359 |
| 2013/0126774 A1* | 5/2013 | Venkatesh | ............... | H01L 41/18 252/62.9 R |
| 2013/0257655 A1* | 10/2013 | Hu | ............... | H04B 7/0413 342/373 |
| 2013/0272157 A1* | 10/2013 | Gao | ............... | H04W 52/146 370/252 |
| 2013/0273974 A1* | 10/2013 | Lea | ............... | H04L 25/03828 455/562.1 |
| 2014/0064398 A1* | 3/2014 | Ibrahim | ............... | H04B 1/44 375/267 |
| 2014/0086077 A1* | 3/2014 | Safavi | ............... | H04W 24/02 370/252 |
| 2014/0098731 A1* | 4/2014 | Maaref | ............... | H04W 72/121 370/312 |
| 2014/0146907 A1* | 5/2014 | Kim | ............... | H04B 7/0413 375/267 |
| 2014/0192845 A1* | 7/2014 | Szini | ............... | H04B 7/061 375/267 |
| 2014/0307691 A1* | 10/2014 | Zhang | ............... | H04L 1/0618 370/329 |
| 2014/0329562 A1* | 11/2014 | Lea | ............... | H01Q 25/00 455/562.1 |
| 2015/0011236 A1* | 1/2015 | Kazmi | ............... | H04W 52/365 455/456.1 |
| 2015/0189610 A1* | 7/2015 | Siomina | ............... | H04L 5/14 370/280 |
| 2015/0194999 A1* | 7/2015 | Lea | ............... | H04L 5/0007 455/562.1 |
| 2015/0222316 A1* | 8/2015 | Ibrahim | ............... | H04B 1/401 455/78 |
| 2015/0256272 A1* | 9/2015 | Weissman | ............... | H03F 3/213 455/84 |
| 2015/0304004 A1* | 10/2015 | Kim | ............... | H04W 72/042 370/329 |
| 2015/0326287 A1* | 11/2015 | Kazmi | ............... | H04W 52/281 375/267 |
| 2015/0381282 A1* | 12/2015 | Zhang | ............... | H04W 24/10 370/330 |
| 2016/0013831 A1* | 1/2016 | Lea | ............... | H04L 27/01 455/562.1 |
| 2016/0020839 A1* | 1/2016 | Kim | ............... | H04W 72/042 370/329 |

(56) References Cited

U.S. PATENT DOCUMENTS

| | | | | |
|---|---|---|---|---|
| 2016/0020840 | A1* | 1/2016 | Kim | H04B 7/0417 370/329 |
| 2016/0127055 | A1* | 5/2016 | Dayal | H04L 5/0085 370/252 |
| 2016/0143055 | A1* | 5/2016 | Nammi | H04W 74/04 370/329 |
| 2016/0211895 | A1* | 7/2016 | Onggosanusi | H04B 7/0613 |
| 2016/0248467 | A1* | 8/2016 | Lea | H01Q 1/50 |
| 2017/0019159 | A1* | 1/2017 | Vook | H04B 7/0469 |
| 2017/0033848 | A1* | 2/2017 | Cordeiro | H04B 7/0404 |
| 2017/0126291 | A1* | 5/2017 | Lea | H01Q 25/00 |
| 2017/0244451 | A1* | 8/2017 | Raghavan | H04B 7/0617 |
| 2017/0264412 | A1* | 9/2017 | Chen | H04W 72/0446 |
| 2017/0317725 | A1* | 11/2017 | Lea | H01Q 1/48 |
| 2017/0366208 | A1* | 12/2017 | Filipovic | H01Q 9/32 |
| 2018/0167183 | A1* | 6/2018 | Zhang | H04L 1/0027 |
| 2018/0270671 | A1* | 9/2018 | Agnihotri | H04W 24/02 |
| 2018/0343045 | A1* | 11/2018 | Muruganathan | H04B 7/0619 |
| 2019/0036624 | A1* | 1/2019 | Long | H04B 17/17 |
| 2019/0044581 | A1* | 2/2019 | Lea | H04B 1/401 |
| 2019/0089429 | A1* | 3/2019 | Wei | H04B 7/0456 |
| 2019/0098585 | A1* | 3/2019 | Golitschek Edler von Elbwart | H04B 7/0619 |
| 2019/0132098 | A1* | 5/2019 | Wernersson | H04L 5/0048 |
| 2019/0141677 | A1* | 5/2019 | Harrison | H04L 5/0096 |
| 2019/0190569 | A1* | 6/2019 | Nayeb Nazar | H04B 7/0639 |
| 2019/0230578 | A1* | 7/2019 | Karaki | H04W 74/0816 |
| 2019/0326974 | A1* | 10/2019 | Li | H04B 7/0634 |
| 2019/0342037 | A1* | 11/2019 | Karaki | H04L 1/188 |
| 2019/0349974 | A1* | 11/2019 | Sundararajan | H04W 72/14 |
| 2019/0364553 | A1* | 11/2019 | Ko | H04J 13/004 |
| 2020/0068495 | A1* | 2/2020 | Yang | H04W 52/243 |
| 2020/0091608 | A1* | 3/2020 | Alpman | H03L 7/145 |
| 2020/0146063 | A1* | 5/2020 | Xu | H04W 24/08 |
| 2020/0153488 | A1* | 5/2020 | Wu | H04B 7/0689 |
| 2020/0196250 | A1* | 6/2020 | Marcone | H04W 52/365 |
| 2020/0288474 | A1* | 9/2020 | Park | H04W 72/042 |
| 2020/0305169 | A1* | 9/2020 | Loehr | H04W 72/0493 |
| 2020/0313738 | A1* | 10/2020 | Iyer | H04B 7/0689 |
| 2020/0367241 | A1* | 11/2020 | Hosseini | H04W 8/24 |
| 2021/0050972 | A1* | 2/2021 | Zheng | H04L 5/0048 |
| 2021/0067205 | A1* | 3/2021 | Manolakos | H04L 5/0051 |
| 2021/0218523 | A1* | 7/2021 | Hao | H04J 11/0033 |
| 2021/0226750 | A1* | 7/2021 | Cheng | H04L 5/0032 |
| 2021/0273727 | A1* | 9/2021 | Dong | H04B 10/25 |
| 2021/0289425 | A1* | 9/2021 | Sun | H04W 72/042 |

FOREIGN PATENT DOCUMENTS

| | | | | |
|---|---|---|---|---|
| WO | WO-2018031367 A1 * | 2/2018 | | H04B 7/0417 |
| WO | WO-2019199858 A1 | 10/2019 | | |
| WO | WO-2020142980 A1 | 7/2020 | | |
| WO | WO-2021127835 A1 | 7/2021 | | |

OTHER PUBLICATIONS

Partial International Search Report—PCT/US2020/025208—ISA/EPO—dated Jun. 16, 2020 (192108WO).

International Search Report and Written Opinion—PCT/US2020/025208—ISAEPO—dated Sep. 21, 2020 (192108WO).

* cited by examiner

NETWORK-SENSITIVE TRANSMIT DIVERSITY SCHEME

CROSS REFERENCE

The present Application for Patent claims the benefit of U.S. Provisional Patent Application No. 62/827,644 by IYER et al., entitled "NETWORK-SENSITIVE TRANSMIT DIVERSITY SCHEME," filed Apr. 1, 2019, which is assigned to the assignee hereof and expressly incorporated herein.

BACKGROUND

The following relates generally to wireless communications, and more specifically to network-sensitive transmit diversity scheme.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices.

Wireless devices operating in a wireless communication system may be configured differently. For example, each wireless device may have its own set of operational and/or performance capabilities or constraints. Improved reliability between wireless devices may be desirable in some situations where a wireless device includes a set of operational and/or performance capabilities or constraints different from another wireless device in the wireless communication system.

SUMMARY

The described techniques relate to improved methods, systems, devices, and apparatuses that support a network-sensitive transmit diversity scheme. Generally, the described techniques provide for techniques that ensure or otherwise improve (e.g., the reliability of) wireless communications between a transmitting device and the receiving device. Broadly, aspects of the described techniques may include the receiving device providing an indication of the antenna topology it supports to the transmitting device in order to ensure that wireless transmissions to the receiving device can be properly decoded or otherwise recovered. For example, the receiving device may determine or otherwise identify the antenna topology that it supports and transmit a signal to the transmitting device carrying or otherwise conveying an indication of the supported antenna topology. Broadly, the indication of the antenna topology may include information from which the transmitting device may determine one or more diversity types that are supported by the receiving device, e.g., such as frequency diversity, cyclic delay diversity (CDD), polarization diversity, time diversity, and the like. For example, the indication of the antenna topology may indicate whether the receiving device has a dual-polarization antenna or has a single-polarization or single-channel antenna.

The receiving device may provide the signal indicating its supported antenna topology autonomously and/or based on a request from the transmitting device. The transmitting device may select a diversity scheme for communicating with the receiving device based on the antenna topology supported by the receiving device. For example, the transmitting device may enable, disable, modify, or otherwise adjust one or more diversity types included in the diversity scheme based on the antenna topology supported by the receiving device. The transmitting device may perform or otherwise transmit wireless transmission to the receiving device using the selected diversity scheme. Accordingly, the wireless transmissions to the receiving device can be recovered (at least more reliably) by the receiving device using or otherwise based on the diversity type(s) supported by the receiving device (e.g., according to the diversity scheme).

A method of wireless communication at a transmitting device is described. The method may include receiving a signal from a receiving device indicating an antenna topology supported by the receiving device, selecting, based on the antenna topology, a diversity scheme for performing a wireless transmission to the receiving device, the diversity scheme including one or more diversity types from a set of diversity types, and transmitting the wireless transmission to the receiving device employing the selected diversity scheme.

An apparatus for wireless communication at a transmitting device is described. The apparatus may include a processor, memory in electronic communication with the processor, and instructions stored in the memory. The instructions may be executable by the processor to cause the apparatus to receive a signal from a receiving device indicating an antenna topology supported by the receiving device, select, based on the antenna topology, a diversity scheme for performing a wireless transmission to the receiving device, the diversity scheme including one or more diversity types from a set of diversity types, and transmit the wireless transmission to the receiving device employing the selected diversity scheme.

Another apparatus for wireless communication at a transmitting device is described. The apparatus may include means for receiving a signal from a receiving device indicating an antenna topology supported by the receiving device, selecting, based on the antenna topology, a diversity scheme for performing a wireless transmission to the receiving device, the diversity scheme including one or more diversity types from a set of diversity types, and transmitting the wireless transmission to the receiving device employing the selected diversity scheme.

A non-transitory computer-readable medium storing code for wireless communication at a transmitting device is described. The code may include instructions executable by a processor to receive a signal from a receiving device indicating an antenna topology supported by the receiving device, select, based on the antenna topology, a diversity scheme for performing a wireless transmission to the receiving device, the diversity scheme including one or more diversity types from a set of diversity types, and transmit the wireless transmission to the receiving device employing the selected diversity scheme.

In some examples of the method, apparatuses, and non-transitory computer-readable medium described herein, selecting the diversity scheme may include operations, features, means, or instructions for selecting a diversity scheme including a CDD type and where an adjustable delay associated with the CDD type may be selected based on the antenna topology.

In some examples of the method, apparatuses, and non-transitory computer-readable medium described herein, selecting, based on the antenna topology, the diversity scheme may include operations, features, means, or instructions for determining, based on the antenna topology, that the receiving device does not support wireless transmissions performed using an excluded diversity type, where the selected diversity scheme does not include the excluded diversity type.

In some examples of the method, apparatuses, and non-transitory computer-readable medium described herein, performing the wireless transmission may include operations, features, means, or instructions for transmitting a set of concurrent signals, and the excluded diversity type includes at least one of a frequency diversity type or a multi-polarization diversity type (or both) for the set of concurrent wireless transmissions.

In some examples of the method, apparatuses, and non-transitory computer-readable medium described herein, the signal indicating the antenna topology supported by the receiving device may be included in an autonomous transmission from the receiving device.

Some examples of the method, apparatuses, and non-transitory computer-readable medium described herein may further include operations, features, means, or instructions for transmitting a request signal to the receiving device requesting the signal indicating the antenna topology.

In some examples of the method, apparatuses, and non-transitory computer-readable medium described herein, the signal indicating the antenna topology includes an indication of at least one of a receive chain count for the receiving device, an available antenna topology supported by the receiving device, or a lack of support by the receiving device for an antenna topology (or a combination thereof).

In some examples of the method, apparatuses, and non-transitory computer-readable medium described herein, the signal indicating the antenna topology includes an indication that the receiving device includes a single-polarization antenna.

In some examples of the method, apparatuses, and non-transitory computer-readable medium described herein, the signal indicating the antenna topology includes an indication that the receiving device lacks a dual-polarization antenna.

In some examples of the method, apparatuses, and non-transitory computer-readable medium described herein, performing the wireless transmission to the receiving device may include operations, features, means, or instructions for transmitting the wireless transmission using a set of transmit chains included in the transmitting device.

In some examples of the method, apparatuses, and non-transitory computer-readable medium described herein, the receiving device includes at least one of a base station, a wireless communication system simulator, or a test equipment (or a combination thereof).

A method of wireless communication at a receiving device is described. The method may include transmitting a signal to a transmitting device indicating an antenna topology supported by the receiving device and receiving a wireless transmission transmitted by the transmitting device employing a diversity scheme that is supported by the antenna topology.

An apparatus for wireless communication at a receiving device is described. The apparatus may include a processor, memory in electronic communication with the processor, and instructions stored in the memory. The instructions may be executable by the processor to cause the apparatus to transmit a signal to a transmitting device indicating an antenna topology supported by the receiving device and receive a wireless transmission transmitted by the transmitting device employing a diversity scheme that is supported by the antenna topology.

Another apparatus for wireless communication at a receiving device is described. The apparatus may include means for transmitting a signal to a transmitting device indicating an antenna topology supported by the receiving device and receiving a wireless transmission transmitted by the transmitting device employing a diversity scheme that is supported by the antenna topology.

A non-transitory computer-readable medium storing code for wireless communication at a receiving device is described. The code may include instructions executable by a processor to transmit a signal to a transmitting device indicating an antenna topology supported by the receiving device and receive a wireless transmission transmitted by the transmitting device employing a diversity scheme that is supported by the antenna topology.

In some examples of the method, apparatuses, and non-transitory computer-readable medium described herein, transmitting the signal indicating the antenna topology may include operations, features, means, or instructions for transmitting an autonomous transmission that includes the signal indicating the antenna topology.

Some examples of the method, apparatuses, and non-transitory computer-readable medium described herein may further include operations, features, means, or instructions for receiving a request signal from the transmitting device requesting the signal indicating the antenna topology, where transmitting the signal indicating the antenna topology may be based on the request signal.

In some examples of the method, apparatuses, and non-transitory computer-readable medium described herein, the antenna topology does not support at least one of a frequency diversity or a multi-polarization diversity (or both) for a set of concurrent wireless transmissions to the receiving device.

In some examples of the method, apparatuses, and non-transitory computer-readable medium described herein, the signal indicating the antenna topology includes an indication of at least one of a receive chain count for the receiving device, an available antenna topology supported by the receiving device, or a lack of support by the receiving device for an antenna topology (or a combination thereof).

In some examples of the method, apparatuses, and non-transitory computer-readable medium described herein, the signal indicating the antenna topology includes an indication that the receiving device includes a single-polarization antenna.

In some examples of the method, apparatuses, and non-transitory computer-readable medium described herein, the signal indicating the antenna topology includes an indication that the receiving device lacks a dual-polarization antenna.

In some examples of the method, apparatuses, and non-transitory computer-readable medium described herein, receiving the wireless transmission may include operations, features, means, or instructions for receiving a set of concurrent signals.

In some examples of the method, apparatuses, and non-transitory computer-readable medium described herein, the receiving device includes at least one of a base station, a wireless communication system simulator, or a test equipment (or a combination thereof).

DETAILED DESCRIPTION

Figure 1:
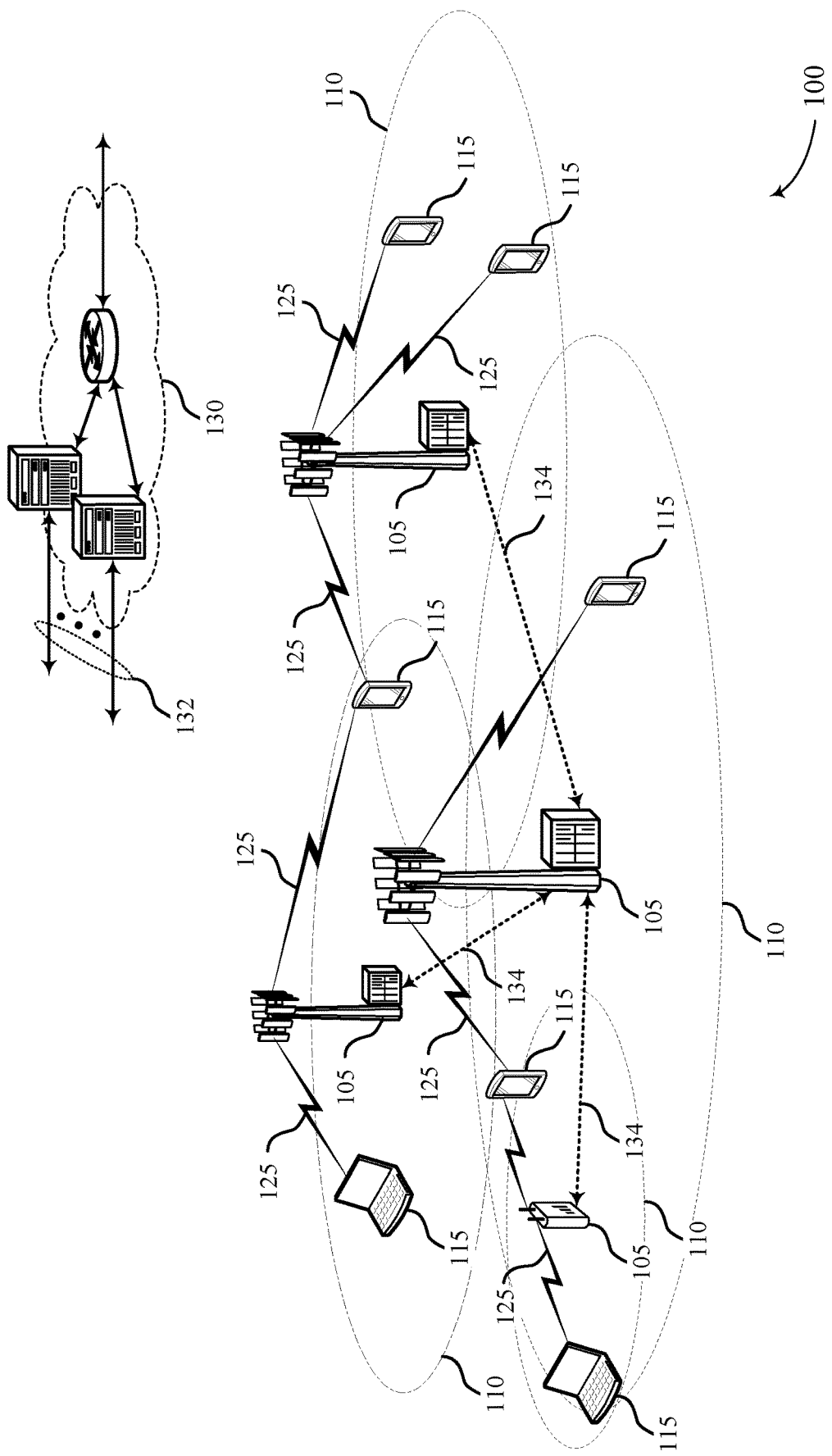
FIG. 1 illustrates an example of a system for wireless communications that support a network-sensitive transmit diversity scheme in accordance with aspects of the present disclosure.

A wireless multiple-access communications system may include a number of base stations or network access nodes, each simultaneously supporting communication for multiple communication devices, which may be otherwise known as user equipment (UE). However, the wireless devices communicating over a wireless communication system may be configured differently, such that each wireless device may support different diversity types (e.g., may have different antenna topologies, related processing capabilities, or both). Broadly, examples of diversity types may include, but are not limited to, frequency diversity, time diversity, beamforming (spatial) diversity, cyclic delay diversity (CDD), polarization diversity, and the like. In some cases, CDD may be considered a form, type, or example of frequency diversity (e.g., the effects of CDD and frequency diversity may be similar). In some examples, the differences in diversity type(s) supported by different wireless devices may interfere with wireless communications between such devices.

For example, a UE may have a different configuration than a base station, and vice versa, which may support different operational capabilities than the base station. Moreover, different UEs (or base stations) may have unique operational and/or performance capabilities. For example, legacy UEs may be configured differently from advanced UEs. Such differences may be hardwired (e.g., wireless devices having different components), implementation-specific (e.g., wireless devices may be programmed or otherwise configured to operate differently), and/or based on a temporary situation (e.g., due to the current load the wireless device is experiencing).

In another example, wireless devices may be different in terms of their purpose. For example, some base stations may be configured to perform wireless communications with UEs within its coverage area and/or may serve a unique purpose (e.g., may be configured or otherwise operate as a piece of test equipment, a system simulator, and the like). As another example, some pieces of test equipment, system simulators, and the like may be configured to mimic a base station. While such differences may be advantageous in some situations, there may be circumstances where the capabilities of one wireless device (e.g., a receiving wireless device) may impact the operations of another wireless device (e.g., a transmitting wireless device). For example, the antenna topology of one device (e.g., the receiving device) may be different from the antenna topology of the other device (e.g., the transmitting device), which may disrupt or otherwise interfere with wireless between such devices.

Aspects of the disclosure are initially described in the context of a wireless communications system. Aspects of the disclosure provide for a receiving device to provide an indication of the antenna topology that the receiving device supports to a transmitting device (e.g., autonomously and/or based on receiving a request from the transmitting device). Generally, the antenna topology may carry or convey an indication of one or more diversity types that the receiving device supports. Accordingly, the transmitting device may receive the indication of the antenna apology supported by the receiving device and use this information when selecting a diversity scheme for performing wireless transmissions to the receiving device. Selecting and enacting (using) the diversity scheme may include the transmitting device enabling or disabling a diversity type, or modifying various parameters of a diversity type, according to the antenna topology supported by the receiving device. The transmitted device may transmit one or more wireless transmissions to the receiving device according to, or otherwise using, the selected diversity scheme (e.g., the transmit diversity scheme). This may improve the ability of the receiving device to recover the information conveyed in the wireless transmissions from the transmitting device.

Aspects of the disclosure are further illustrated by and described with reference to apparatus diagrams, system diagrams, and flowcharts that relate to network-sensitive transmit diversity scheme.

FIG. 1 illustrates an example of a wireless communications system 100 that support a network-sensitive transmit diversity scheme in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices. In some cases, the base station 105 and UE 115 may have different antenna topologies. For example, the UE 115 may have a dual-polarization antenna topology, and the base station 105 may have a single-polarization or single-channel antenna topology.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115, when configured or otherwise acting as a transmitting device, may receive a signal from a receiving device indicating an antenna topology supported by the receiving device. The UE 115 may select, based at least in part on the antenna topology, a diversity scheme for performing a wireless transmission to the receiving device, the diversity scheme including one or more diversity types from a plurality of diversity types. The UE 115 may transmit the wireless transmission to the receiving device employing the selected diversity scheme. Although such techniques are described with respect to a UE 115, it is to be understood that such techniques may additionally or alternatively be implemented by a base station 105.

In some aspects, a base station 105, when configured or otherwise acting as a receiving device, may transmit a signal to a transmitting device indicating an antenna topology supported by the receiving device. The base station 105 may receive a wireless transmission transmitted by the transmitting device employing a diversity scheme that is supported by the antenna topology. Although such techniques are described with respect to a base station 105, it is to be understood that such techniques may additionally or alternatively be implemented by a UE 115.

Figure 2:
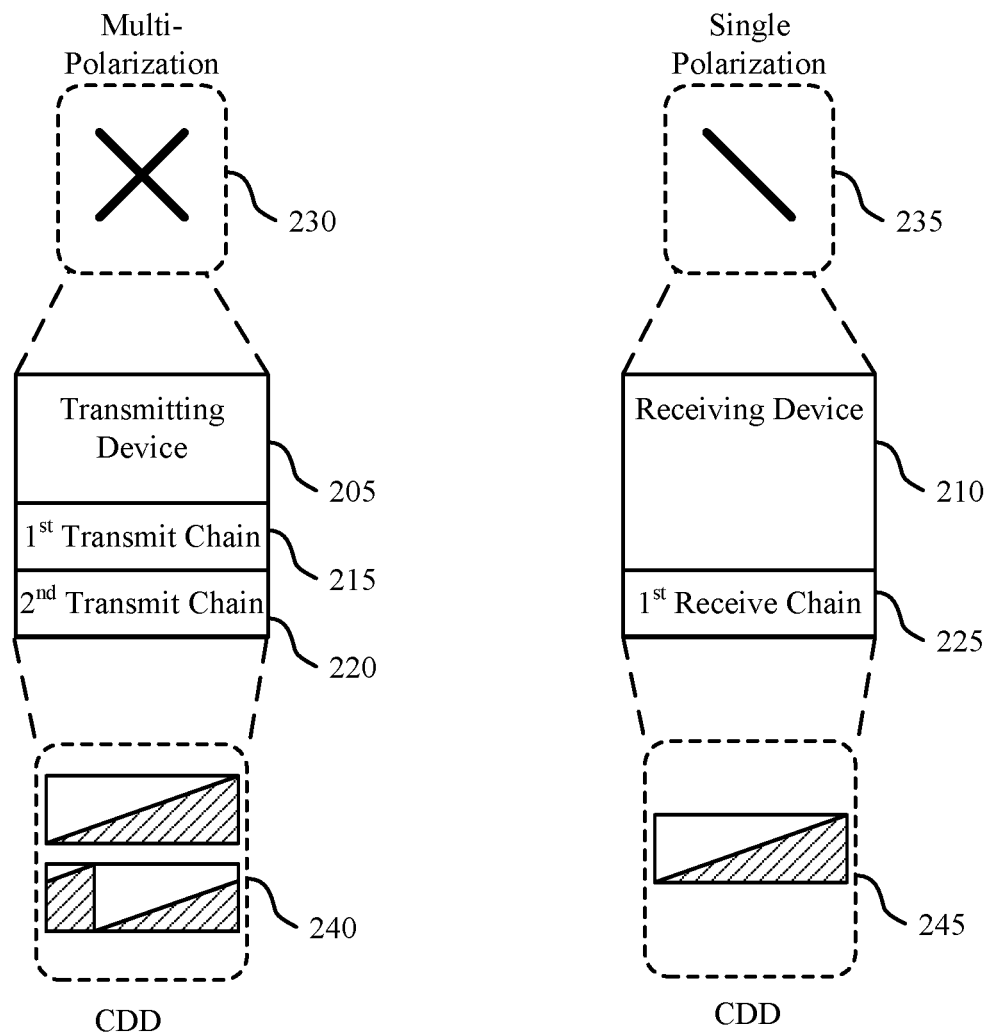
FIG. 2 illustrates an example of a wireless communication system that support a network-sensitive transmit diversity scheme in accordance with aspects of the present disclosure.

FIG. 2 illustrates an example of a wireless communication system 200 that support a network-sensitive transmit diversity scheme in accordance with aspects of the present disclosure. In some examples, wireless communication system 200 may implement aspects of wireless communication system 100. Aspects of wireless communication system 200 may be implemented by a transmitting device 205 and a receiving device 210, which may be examples of the corresponding devices described herein. For example, either or both of transmitting device 205 and/or receiving device 210 may be examples of a UE and/or a base station, as is discussed herein.

Generally, wireless communications between wireless devices may utilize one or more diversity types to improve reliability, throughput, redundancy, and the like. However, wireless devices may be configured differently, such that one diversity type may be supported by a first wireless device, but unsupported by a second wireless device. Such differences between the wireless devices may be permanent (e.g., hardware-based), due to different configurations being implemented on each wireless devices, and/or due to a temporary condition being experienced by one of the wireless devices (e.g., the wireless device may be utilizing one transmit/receive chain for priority communications, which may only leave one unused transmit/receive chain available for communications with another wireless device). Differences in the diversity types supported between wireless devices may be problematic during some wireless communications, e.g., a transmitting device may employ certain diversity type(s) that are unsupported by the receiving device, or vice versa, which may disrupt communications between the wireless devices.

As one non-limiting example, wireless transmissions may be configured to support transmission using multiple transmit chains of the transmitting device. The transmit chains may transmit in orthogonal polarizations, using frequency diversity (e.g., explicit and/or transparent), cyclic delay diversity, and the like. As one more particular example, a wireless transmission that is transmitted using a multi-polarization diversity type may be received by a receiving device using a single polarization diversity type. This may result in the power spectral density of the received signal varying significantly due to misalignment (e.g., differences in polarization) between the multi-polarization transmitted signal and the signal as received and processed by the receiving device. Accordingly, a wireless transmission can be very difficult to demodulate for a single polarization diversity type configured receiving device configured to support a single polarization diversity type when the wireless transmission is transmitted using a multi-polarization diversity type by the transmitting device. The result of the transmitting device using a multi-polarization or other diversity type may be that the wireless transmissions may be complex, which may entail the receiving device having the capability to receive and to demodulate the uplink transmissions employing the corresponding diversity types. In the event that the diversity types are unequal or otherwise different between the transmitting device and the receiving device, this may prevent or otherwise disrupt wireless communications between such devices. Accordingly, aspects of the described techniques provide various mechanisms, alone or in any combination, which support the transmitting device (such as transmitting device 205) selecting a diversity scheme based on the antenna topology supported by the receiving device (such as receiving device 210).

For example, transmitting device 205 and receiving device 210 may be configured differently and/or otherwise support different diversity types. In some aspects, the collective diversity type(s) supported by transmitting device 205 and/or receiving device 210 may be considered the antenna topology supported by transmitting device 205 and/or receiving device 210, respectively.

One example of a diversity type may be or relate to the number of transmit/receive chains implemented or otherwise currently available on each device. For example, transmitting device 205 may have a first transmit chain 215 and a second transmit chain 220 used for performing wireless transmissions. In some aspects, the first transmit chain 215 and the second transmit chain 220 may be the same (e.g., may operate over the same frequencies, may have the same performance capabilities, and the like), or they may be different. In contrast, receiving device 210 may have the first receive chain 225 available. For example, receiving device 210 may have the first receive chain 225 available permanently (e.g., as configured or otherwise implemented) and/or temporarily (e.g., due to a second receive chain (not shown) currently being unavailable). Accordingly, in some examples the antenna topology of receiving device 210 may include a receive chain count of one, which is different from the transmit chain count of two of transmitting device 205.

In some aspects, the transmit/receive chains implemented by transmitting device 205 and/or receiving device 210 may determine (dictate) whether or not the respective device supports a frequency diversity type. For example, transmitting device 205 may use the first transmit chain 215 to transmit a signal in a first frequency, and may use the second transmit chain 220 to transmit a signal in a second frequency that is different from the first frequency. However, the first receive chain 225 of receiving device 210 may only support reception of one frequency at a time.

Another example of a diversity type may be or relate to the antenna configurations (e.g., available antenna typologies) supported by each device. For example, transmitting device 205 may have or otherwise support multi-polarization 230 as a diversity type, whereas receiving device 210 may have otherwise support single polarization 235 as a diversity type. That is, transmitting device 205 may support multi-polarization 230 such that it can transmit concurrent signals from each of the first transmit chain 215 and the second transmit chain 220 at different polarizations (with a 90° polarization shift relative to one another being shown by way of example only). However, receiving device 210 may only be a capable of receiving (at least reliably or with some guarantee of reliability) a single polarization signal using the single polarization 235 diversity type. That is, receiving device 210 may be either permanently configured to support reception using the single polarization 235 and/or may be temporarily configured to support reception using the single polarization 235 (e.g., due to receiving device 210 using one or more additional antenna arrays or sub-arrays for different wireless communications at the same time). Accordingly, in some examples the antenna topology of receiving device 210 may include a single polarization 235, which is different from the multi-polarization 230 of transmitting device 205.

Another example of a diversity type may be or relate to CDD. For example, transmitting device 205 may be configured or otherwise support CDD 240 as a diversity type, which may be unsupported (or have limited support) by receiving device 210 in CDD 245. Broadly, CDD 240 may correspond to a transmit diversity type implemented by transmitting device 205 applying a different phase shift (e.g., cyclic phase delay) for each subcarrier or tone. More particularly, CDD 240 may include one antenna transmitting the original copy of the data (shown in the top portion of CDD 240), while the other antenna is transmitting the cyclic phase shifted version of the original data (as shown in the bottom portion of CDD 240). In some aspects, CDD 240 may generally be implemented as spatial multiplexing to increase the diversity between distinct spatial paths. For example, aspects of CDD may include spatial diversity being transformed into frequency diversity, thereby avoiding inter-symbol interference.

As one non-limiting example, operations in frequency range 2 (FR2)—which may include frequencies in the 25 GHz to 53 GHz range—may include transmitting device 205 using patch and dipole antennas at different locations of transmitting device 205. CDD 240 may be applied differently to one category of antenna type versus the other. However, CDD 245 supported by a receiving device 210 may include a lack of support for CDD and/or limited support for CDD by receiving device 210. Accordingly, in some examples the antenna topology of receiving device 210 may include a lack of support (or limited support) for CDD 245, which is different from the CDD 240 of transmitting device 205.

It is to be understood that the examples diversity types that may form or otherwise relate to the differences between the antenna typologies of transmitting device 205 and receiving device 210 are provided by way of example only. There may be other differences in supported or unsupported diversity types between each device according to aspects of the described techniques.

In some aspects, receiving device 210 may transmit or otherwise provide an indication of the antenna topology it supports to transmitting device 205. In one example, this may include receiving device 210 autonomously (e.g., unilaterally, independent from transmitting device 205) transmitting or providing the indication of its supported antenna topology to transmitting device 205. In another example, receiving device 210 may transmit or provide the indication of its supported antenna topology in response to a request signal transmitted from transmitting device 205 requesting the antenna topology supported by receiving device 210. In some aspects, receiving device 210 may transmit or provide the indication of the supported antenna topology as part of an initial set up message (e.g., in a capability configuration signal, in an initial configuration signal, and the like). In some aspects, receiving device 210 may transmit or provide the indication of the supported antenna topology as part of higher layer signaling, e.g., in an RRC message, in a medium access control (MAC) control element (CE), and the like.

Generally, the signal conveying the indication of the antenna topology may carry or convey an indication of one or more diversity types supported or unsupported by receiving device 210. For example, the antenna topology may carry or otherwise convey an indication of whether or not receiving device 210 supports multi-polarization or single polarization, a receive chain count of receiving device 210, whether or not receiving device 210 supports CDD, whether or not receiving device 210 supports an available antenna topology (e.g., antenna configurations used for polarization diversity, beamforming diversity, etc.), and the like. In the event where one or more of the diversity types indicated in the antenna topology is temporary, the signal indicating the antenna topology supported by receiving device 210 may also indicate the duration in which the diversity type is unavailable or limited. In some aspects, the indication of the antenna topology may also carry or otherwise convey an indication of various parameters or operational capabilities supported by receiving device 210 for the respective diversity type. For example, a receiving device 210 may support CDD 245, that may have various limitations on the amount of the delay in the CDD 245 that can be supported. That is, CDD 240 and/or CDD 245 may have varying degrees of delay which can be implemented, although CDD 240 may have a wider range of delays supported by transmitting device 205 than is supported by CDD 245 of receiving device 210.

Transmitting device 205 may receive the signal indicating the antenna topology supported by receiving device 210 and, in response, select a diversity scheme for performing wireless transmissions to receiving device 210. In some aspects, the diversity scheme may include one or more of the diversity types from a plurality of diversity types supported by receiving device 210. For example, transmitting device 205 may select diversity types that are supported by receiving device 210 (as indicated in the antenna topology). As another example, transmitting device 205 may adjust various parameters of the diversity types in the diversity scheme to correspond to the parameters in the diversity types supported by receiving device 210. It is to be understood that various diversity schemes may be selected, depending on the antenna topology of receiving device 210.

One example of a diversity scheme may include a CDD diversity type, a transmit/receive chain diversity type, a polarization diversity type, and the like. That is, the diversity scheme selected by transmitting device 205 based on the antenna topology supported by receiving device 210 may include any combination of diversity types and/or adjusted parameters for diversity types supported by receiving device 210 according to the antenna topology. Thus, one example diversity scheme may include polarization diversity plus CDD diversity. Another example diversity scheme may include just polarization diversity. Another diversity scheme may include just CDD diversity. Another example diversity scheme may include just transmit/receive chain diversity (e.g., such as frequency diversity supported using multiple transmit/receive chains). Another example diversity scheme may include adjusting the delay in CDD diversity, adjusting the degree of polarization shift in polarization diversity, and the like. For example, deactivating or otherwise removing CDD diversity from a diversity scheme may include reducing the phase delay between signals (e.g., eliminating, reducing the phase delay to or towards zero). As another example, deactivating or otherwise removing polarization diversity from a diversity scheme may include reducing the difference in polarization between signals (e.g., eliminating, reducing the difference in polarization to or towards zero).

Accordingly, transmitting device 205 may select the diversity scheme that includes diversity type(s) and/or specific parameter(s) for certain diversity types supported by the antenna topology of receiving device 210. Moreover, when the antenna topology indicates that receiving device 210 does not support (e.g., excludes) a particular diversity type (either permanently or on a temporary basis), transmitting device 205 may select a diversity scheme that does not include the excluded diversity types. Thus, transmitting device 205 may tailor its wireless transmissions to receiving device 210 in a manner that is responsive to the antenna topology supported by receiving device 210 to improve detection and recovery of the information being communicated in the wireless transmissions.

Thus, transmitting device 205 may transmit the wireless transmissions to receiving device 210 employing (using) the selected diversity scheme. In some aspects, the wireless transmissions may include a plurality of concurrent signals or may include a single signal employing the diversity scheme. In some aspects, one or more of the plurality of concurrent signals may be transmitted using the diversity type(s) supported by receiving device 210 and/or excluding the diversity type(s) unsupported by receiving device 210. For example, the plurality of concurrent transmissions may exclude frequency diversity, polarization diversity, and the like, when such diversity types are unsupported by receiving device 210 in accordance with the indicated antenna topology.

Figure 3:
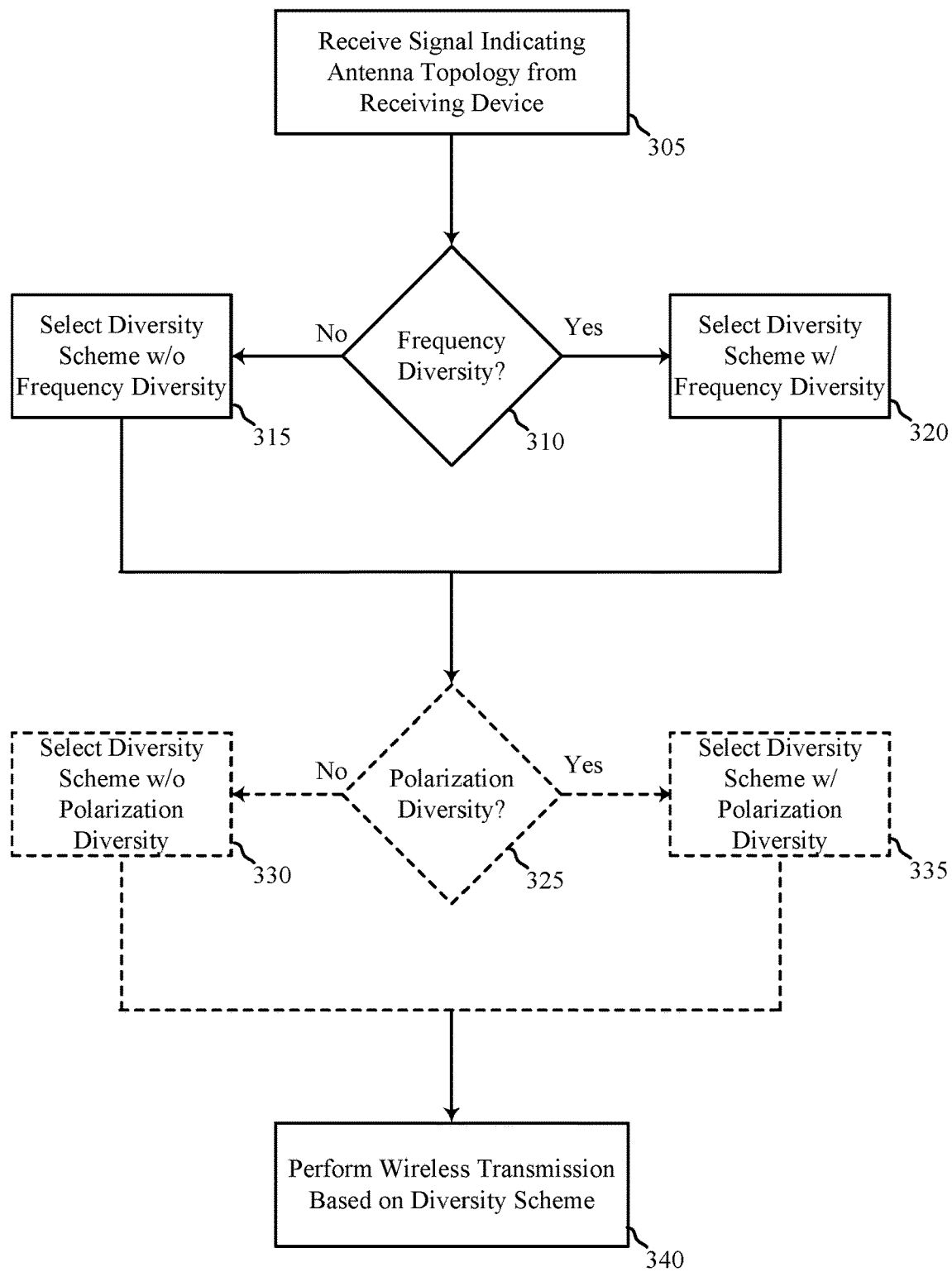
FIG. 3 illustrates an example of a flowchart that support a network-sensitive transmit diversity scheme in accordance with aspects of the present disclosure.

FIG. 3 illustrates an example of a flowchart 300 that support a network-sensitive transmit diversity scheme in accordance with aspects of the present disclosure. In some examples, flowchart 300 may implement aspects of wireless communication systems 100 and/or 200. Aspects of flowchart 300 may be implemented by a transmitting device, which may be an example of a UE and/or a base station as is described herein.

Flowchart 300 may begin at 305 where the transmitting device receives a signal from the receiving device carrying or otherwise conveying an indication of an antenna topology supported by the receiving device. The transmitting device may receive the signal as part of an autonomous transmission from the receiving device and/or in response to a request signal transmitted to the receiving device requesting the indication of the antenna topology. In some aspects, the signal indicating the antenna topology supported by the receiving device may include, but is not limited to, a capability configuration, an initial configuration signal, an RRC signal, a MAC CE, and the like.

In some aspects, the indication of the antenna topology may provide information identifying one or more diversity types (and/or configurations for certain diversity types) supported by the receiving device. In some aspects, this may include an indication of the supported diversity types and/or an indication of excluded diversity types that the receiving device does not support. In some aspects, this may include an indication of various parameters for a given diversity type that the receiving device is able to support. Examples of the diversity types may include, but are not limited to, frequency diversity, spatial diversity, polarization diversity, CDD, and the like.

At 310, the transmitting device may determine whether or not the receiving device supports frequency diversity based at least in part on the indication of the antenna topology supported by the receiving device. For example, the frequency diversity may be supported using one or more receive chains of the receiving device alone or in combination with other diversity techniques, such as CDD. As another example, the frequency diversity may be supported using different types of antennas located at the same or different areas of the receiving device.

In the event that the receiving device does not support frequency diversity, at 315 the transmitting device may select the diversity scheme without frequency diversity (e.g., a diversity scheme that excludes (lacks) or reduces an amount of frequency diversity, such as by reducing or eliminating the phase delay associated with CDD) to use for wireless transmissions to the receiving device. In the event that the receiving device does support frequency diversity, at 320 the transmitting device may select a diversity scheme with frequency diversity (e.g., a diversity scheme that includes frequency diversity) to use for wireless transmissions to the receiving device. As discussed, frequency diversity may be implemented using one or more diversity types supported by the receiving device (e.g., a receive chain count of the receiving device, support for CDD by the receiving device, and the like) as indicated in the antenna topology.

At 325, the transmitting device may optionally (as indicated by the dashed lines) determine whether or not the receiving device supports polarization diversity. For example, the transmitting device may, based on the antenna topology supported by the receiving device, determine whether or not the receiving device supports, or lack support for, an available antenna topology (e.g., such as one or more different antenna types, the number of antennas implemented on the receiving device, and/or the available configurations for the antennas implemented on the receiving device).

In the event that the receiving device does not support polarization diversity, at 330 the transmitting device may optionally select a diversity scheme without polarization diversity (e.g., a diversity scheme that excludes (lacks) or reduces an amount of polarization diversity, such as by reducing or eliminating a difference in polarization between signals associated with different transmit chains) to use for performing wireless transmissions to the receiving device. In the event that the receiving device supports polarization diversity, at 335 the transmitting device may optionally select a diversity scheme that includes polarization diversity to use for performing wireless transmissions to the receiving device.

It is to be understood that additional diversity types may be considered by the transmitting device in accordance with aspects of the described techniques. That is, the transmitting device may generally consider any diversity type supported by the receiving device (as indicated in the antenna topology) when selecting the diversity scheme to use for performing wireless transmissions to the receiving device.

At 340, the transmitting device may transmit or otherwise perform the wireless transmissions to the receiving device employing or otherwise in accordance with the selected diversity scheme. In some aspects, this may include a transmitting device performing or otherwise transmitting a plurality of concurrent signals to the receiving device.

Figure 4:
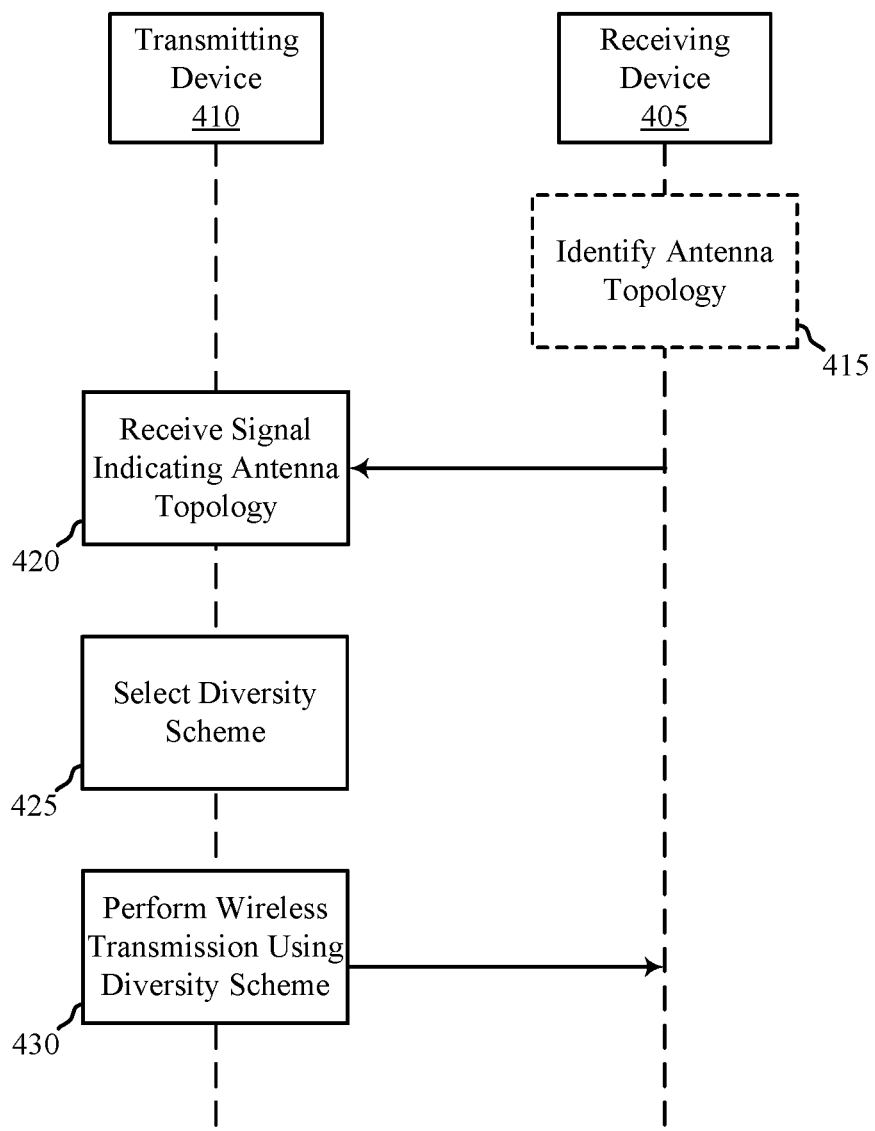
FIG. 4 illustrates an example of a process that support a network-sensitive transmit diversity scheme in accordance with aspects of the present disclosure.

FIG. 4 illustrates an example of a process 400 that support a network-sensitive transmit diversity scheme in accordance with aspects of the present disclosure. In some examples, process 400 may implement aspects of wireless communication systems 100, 200, and/or flowchart 300. Aspects of process 400 may be implemented by a receiving device 405 and transmitting device 410, which may be examples of the corresponding devices described herein. That is, the receiving device 405 and/or the transmitting device 410 may be examples of the UE and/or base station, as is described herein. In one non-limiting example, the transmitting device 410 is an example of a UE, where the receiving device 405 is an example of a base station, a piece of test equipment, a system simulator (e.g., a system that simulates a wireless communication network), and the like.

At 415, the receiving device 405 may optionally determine or otherwise identify the antenna topology that it supports. Generally, the antenna topology may correspond to or otherwise include one or more diversity types that are supported by the receiving device 405. Examples of such diversity types include, but are not limited to, frequency diversity, polarization diversity, CDD, and the like, either alone or in any combination. In some aspects, the antenna topology may correspond to or otherwise include various parameters for the supported diversity types. For example, the receiving device 405 may support certain aspects of a particular diversity type, e.g., using a limited or reduced range of the parameters that might otherwise be associated with that diversity type.

In some aspects, the antenna topology may carry or convey an indication of the receive chain count for the receiving device 405, an available antenna topology supported by the receiving device 405, a lack of support for a given or particular antenna topology by the receiving device 405, and the like. In some aspects, the signal indicating the antenna topology may carry or convey an indication that the receiving device 405 includes or is otherwise configured with a single-polarization antenna. In some aspects, the signal indicating the antenna topology may carry or convey an indication that the receiving device 405 lacks or is otherwise unable to support a dual-polarization antenna.

At 420, the receiving device 405 may transmit (and the transmitting device 410 may receive) a signal indicating the antenna topology supported by the receiving device 405. The receiving device 405 may transmit the signal as part of an autonomous transmission to the transmitting device 410 (e.g., independently and without being instructed to transmit the signal) and/or in response to a request signal from the transmitting device 410 requesting the indication of the antenna topology supported by the receiving device 405. Examples of the signal include, but are not limited to, an initial configuration signal, a capability configuration signal, an RRC signal, a MAC CE, and the like.

At 425, the transmitting device 410 may select a diversity scheme to use for wireless transmissions to the receiving device 405 based at least in part on the antenna topology supported by the receiving device 405. In some aspects, this may include the transmitting device 410 selecting a diversity scheme that includes a CDD type. For example, the transmitting device 410 may select a diversity scheme that enables CDD and/or adjust the delay utilized in CDD based at least in part on the antenna topology supported by the receiving device 405.

In some aspects, this may include the transmitting device 410 using the information conveyed in the antenna topology indication to determine that the receiving device 405 does not support wireless transmission(s) using one or more excluded diversity types. In this instance, the selected diversity scheme may exclude or otherwise not include the excluded diversity types. For example, the transmitting device 410 may transmit wireless transmissions to the receiving device 405 that includes a plurality of concurrent signals, with the excluded diversity types including frequency diversity, polarization diversity, and the like.

At 430, the transmitting device 410 may transmit (and the receiving device 405 may receive) wireless transmissions employing or otherwise utilizing the selected diversity scheme. In some aspects, this may include the transmitting device 410 using a plurality of its transmit chains to perform the wireless transmissions to the receiving device 405. For example, the antenna topology indication received from the receiving device 405 may indicate a plurality of receive chains of the receiving device 405 being available for use. Accordingly, the diversity scheme selected by the transmitting device 410 may include a diversity type using multiple transmit/receive chains, e.g., frequency diversity, CDD, time diversity, and the like.

Accordingly, process 400 illustrates an example process whereby receiving device 405 provides an indication of the antenna topology that it supports to the transmitting device 410, which may improve selection of a particular diversity scheme by the transmitting device 410 to use for wireless transmissions to the receiving device 405. As discussed above, the receiving device 405 may provide the indication of the supported antenna topology in an autonomous transmission to the transmitting device 410.

In some aspects, the receiving device 405 may provide one or more additional signals to the transmitting device 410 indicating an updated antenna topology supported by the receiving device 405. For example, in the situation where one or more of the supported diversity types is based on a temporary condition (e.g., ongoing communications with a different transmitting device, congestion levels, limited available power, and the like), the receiving device 405 may transmit or otherwise provide an indication of an updated antenna topology to the transmitting device 410 once the temporary condition has changed. Accordingly, the transmitting device 410 may select an updated diversity scheme to use for future wireless transmissions to the receiving device 405 based on the subsequently indicated updated antenna topology.

Figure 5:
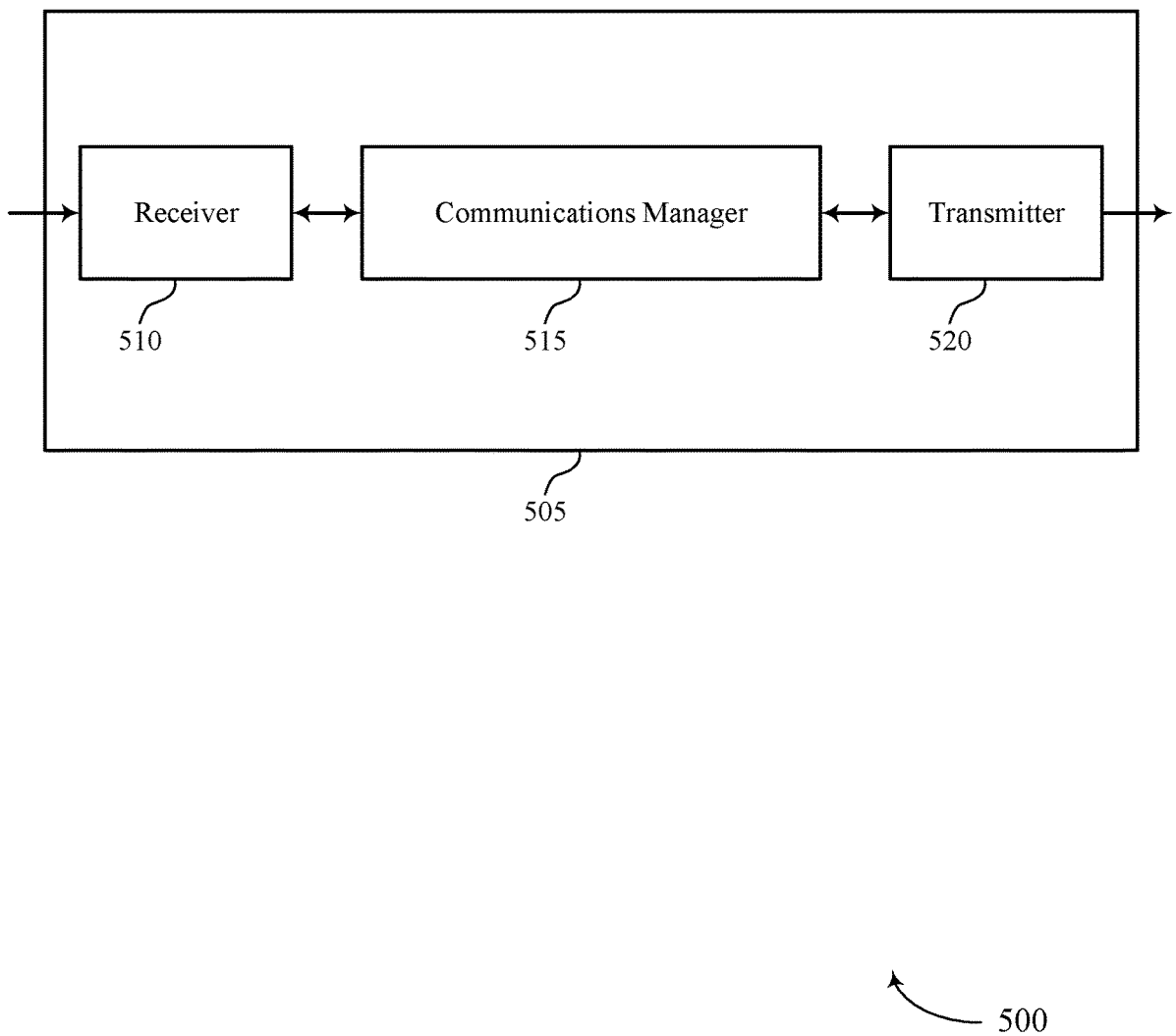
FIGS. 5 and 6 show block diagrams of devices that support a network-sensitive transmit diversity scheme in accordance with aspects of the present disclosure.

FIG. 5 shows a block diagram 500 of a device 505 that support a network-sensitive transmit diversity scheme in accordance with aspects of the present disclosure. The device 505 may be an example of aspects of a UE 115 or a transmitting device, as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to network-sensitive transmit diversity scheme, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a signal from a receiving device indicating an antenna topology supported by the receiving device, select, based on the antenna topology, a diversity scheme for performing a wireless transmission to the receiving device, the diversity scheme including one or more diversity types from a set of diversity types, and transmit the wireless transmission to the receiving device employing the selected diversity scheme. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
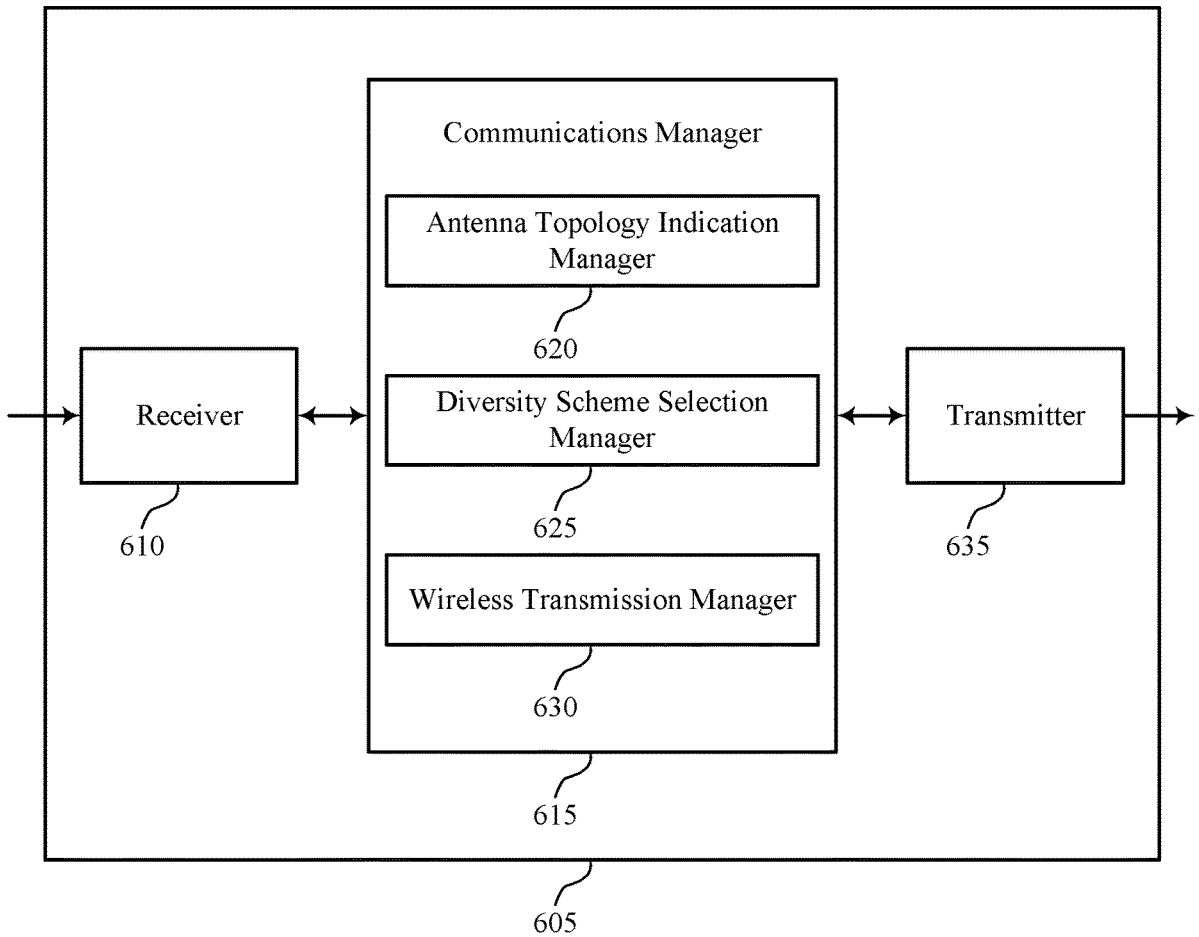

FIG. 6 shows a block diagram 600 of a device 605 that support a network-sensitive transmit diversity scheme in accordance with aspects of the present disclosure. The device 605 may be an example of aspects of a device 505, or a UE 115, or a transmitting device, as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to network-sensitive transmit diversity scheme, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an antenna topology indication manager 620, a diversity scheme selection manager 625, and a wireless transmission manager 630. The communications manager 615 may be an example of aspects of the communications manager 810 described herein.

The antenna topology indication manager 620 may receive a signal from a receiving device indicating an antenna topology supported by the receiving device.

The diversity scheme selection manager 625 may select, based on the antenna topology, a diversity scheme for performing a wireless transmission to the receiving device, the diversity scheme including one or more diversity types from a set of diversity types.

The wireless transmission manager 630 may transmit the wireless transmission to the receiving device employing the selected diversity scheme.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
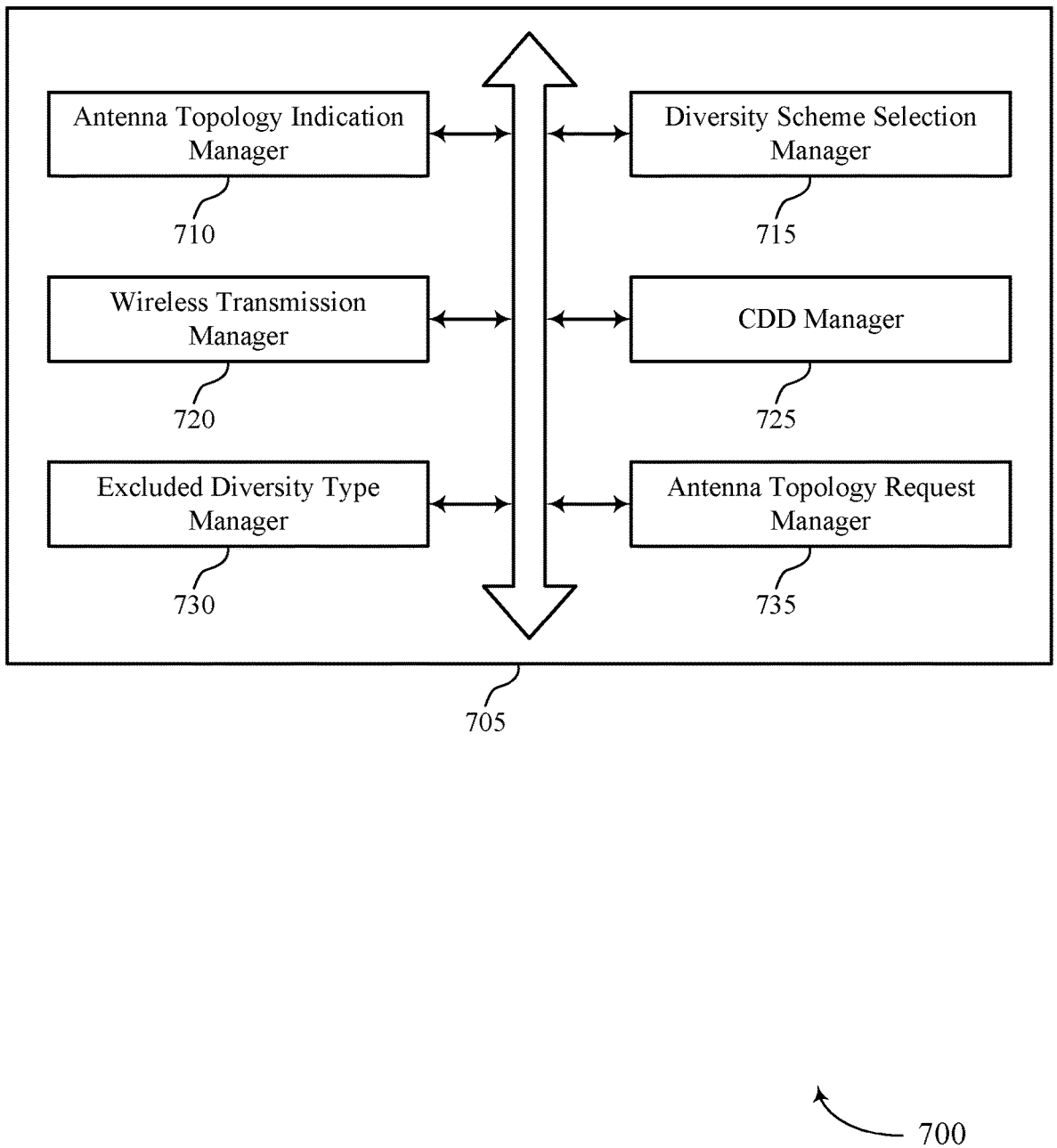
FIG. 7 shows a block diagram of a communications manager that support a network-sensitive transmit diversity scheme in accordance with aspects of the present disclosure.

FIG. 7 shows a block diagram 700 of a communications manager 705 that support a network-sensitive transmit diversity scheme in accordance with aspects of the present disclosure. The communications manager 705 may be an example of aspects of a communications manager 515, a communications manager 615, or a communications manager 810 described herein. The communications manager 705 may include an antenna topology indication manager 710, a diversity scheme selection manager 715, a wireless transmission manager 720, a CDD manager 725, an excluded diversity type manager 730, and an antenna topology request manager 735. Each of these modules may communicate, directly or indirectly, with one another (e.g., via one or more buses).

The antenna topology indication manager 710 may receive a signal from a receiving device indicating an antenna topology supported by the receiving device. In some cases, the signal indicating the antenna topology supported by the receiving device is included in an autonomous transmission from the receiving device. In some cases, the signal indicating the antenna topology includes an indication of at least one of a receive chain count for the receiving device, an available antenna topology supported by the receiving device, or a lack of support by the receiving device for an antenna topology, or a combination thereof. In some cases, the signal indicating the antenna topology includes an indication that the receiving device includes a single-polarization antenna. In some cases, the signal indicating the antenna topology includes an indication that the receiving device lacks a dual-polarization antenna.

The diversity scheme selection manager 715 may select, based on the antenna topology, a diversity scheme for performing a wireless transmission to the receiving device, the diversity scheme including one or more diversity types from a set of diversity types.

The wireless transmission manager 720 may transmit the wireless transmission to the receiving device employing the selected diversity scheme. In some examples, the wireless transmission manager 720 may transmit the wireless transmission using a set of transmit chains included in the transmitting device. In some cases, the receiving device includes at least one of a base station, a wireless communication system simulator, or a test equipment, or a combination thereof.

The CDD manager 725 may select the diversity scheme by selecting a diversity scheme including a cyclic delay diversity type and where an adjustable delay associated with the cyclic delay diversity type is selected based on the antenna topology.

The excluded diversity type manager 730 may determine, based on the antenna topology, that the receiving device does not support wireless transmissions performed using an excluded diversity type, where the selected diversity scheme does not include the excluded diversity type. In some examples, performing the wireless transmission includes transmitting a set of concurrent signals. In some cases, the excluded diversity type includes at least one of a frequency diversity type or a multi-polarization diversity type, or both, for the set of concurrent wireless transmissions.

The antenna topology request manager 735 may transmit a request signal to the receiving device requesting the signal indicating the antenna topology.

Figure 8:
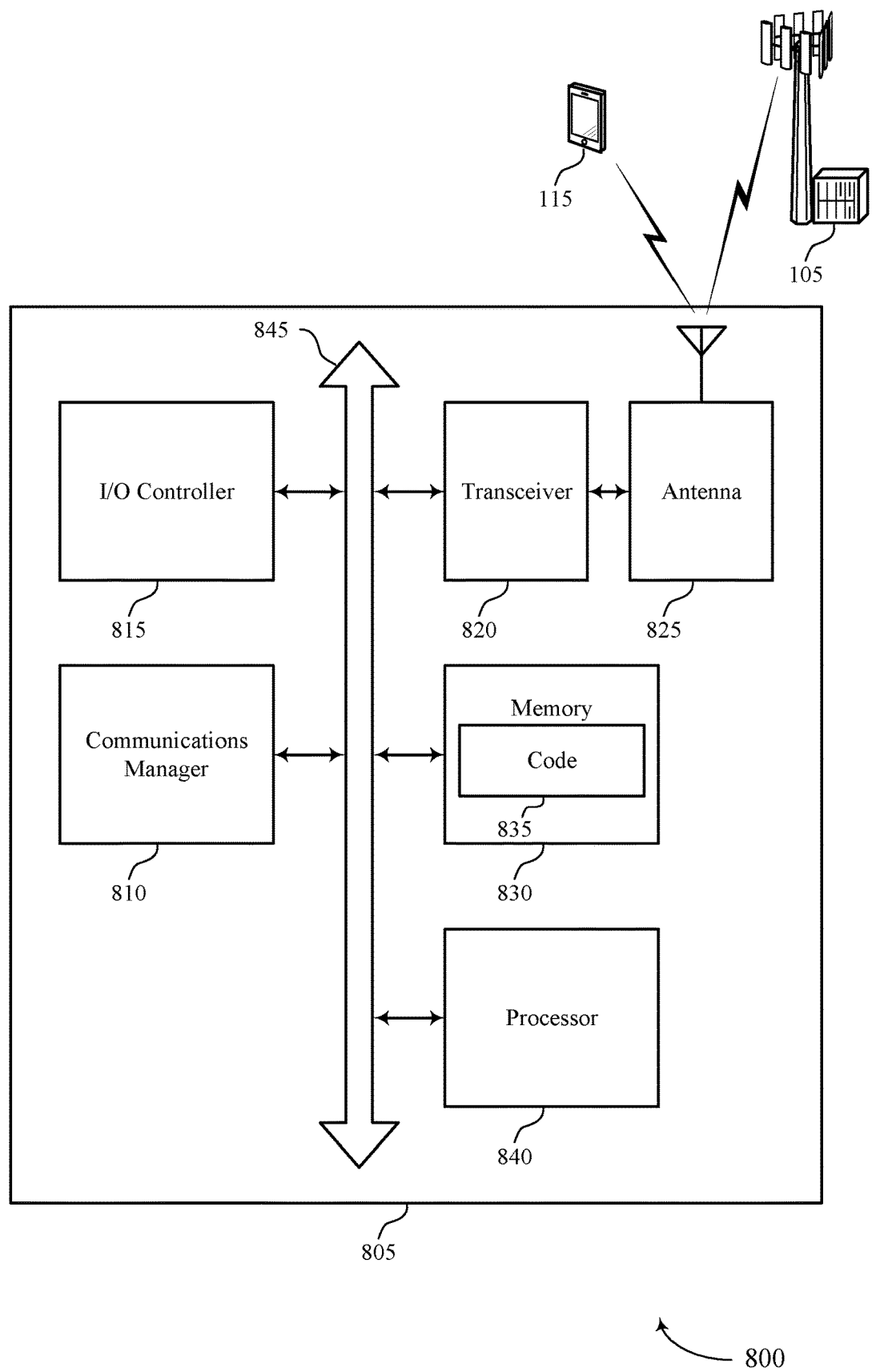
FIG. 8 shows a diagram of a system including a device that support a network-sensitive transmit diversity scheme in accordance with aspects of the present disclosure.

FIG. 8 shows a diagram of a system 800 including a device 805 that support a network-sensitive transmit diversity scheme in accordance with aspects of the present disclosure. The device 805 may be an example of or include the components of device 505, device 605, or a UE 115, or a transmitting device, as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a signal from a receiving device indicating an antenna topology supported by the receiving device, select, based on the antenna topology, a diversity scheme for performing a wireless transmission to the receiving device, the diversity scheme including one or more diversity types from a set of diversity types, and transmit the wireless transmission to the receiving device employing the selected diversity scheme.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting network-sensitive transmit diversity scheme).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Beneficially, communications manager 810 may tailor its wireless transmissions to a receiving device in a manner that is responsive to the antenna topology supported by the receiving device thereby assisting transceiver 820 and associated components of device 805 to perform effective wireless communications by improving detection and recovery of the information being communicated such that retransmissions or unnecessary transmissions may be avoided.

Figure 9:
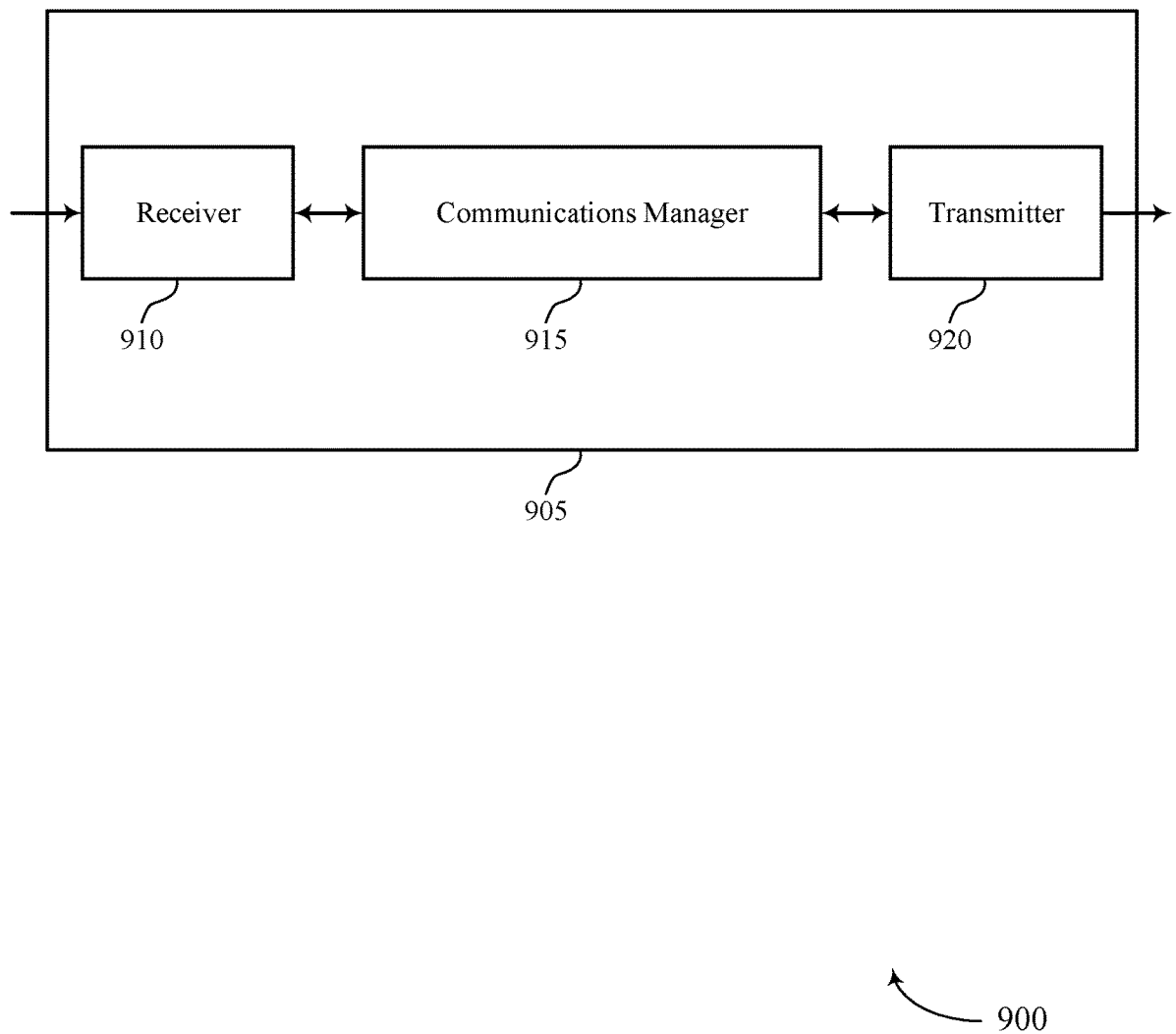
FIGS. 9 and 10 show block diagrams of devices that support a network-sensitive transmit diversity scheme in accordance with aspects of the present disclosure.

FIG. 9 shows a block diagram 900 of a device 905 that support a network-sensitive transmit diversity scheme in accordance with aspects of the present disclosure. The device 905 may be an example of aspects of a base station 105 or a receiving device, as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to network-sensitive transmit diversity scheme, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a signal to a transmitting device indicating an antenna topology supported by the receiving device and receive a wireless transmission transmitted by the transmitting device employing a diversity scheme that is supported by the antenna topology. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
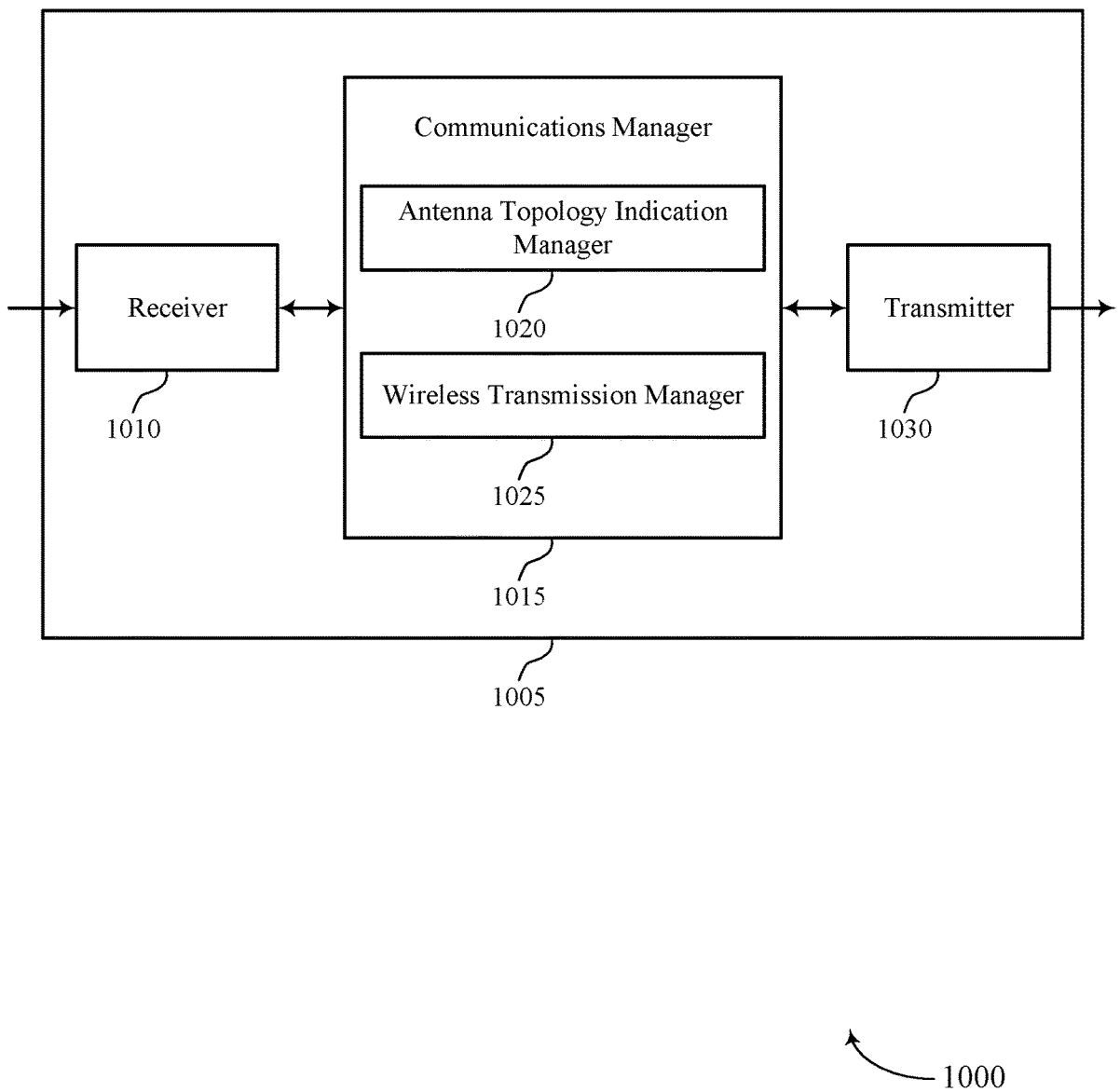

FIG. 10 shows a block diagram 1000 of a device 1005 that support a network-sensitive transmit diversity scheme in accordance with aspects of the present disclosure. The device 1005 may be an example of aspects of a device 905, or a base station 105, or a receiving device, as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to network-sensitive transmit diversity scheme, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an antenna topology indication manager 1020 and a wireless transmission manager 1025. The communications manager 1015 may be an example of aspects of the communications manager 1210 described herein.

The antenna topology indication manager 1020 may transmit a signal to a transmitting device indicating an antenna topology supported by the receiving device.

The wireless transmission manager 1025 may receive a wireless transmission transmitted by the transmitting device employing a diversity scheme that is supported by the antenna topology.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
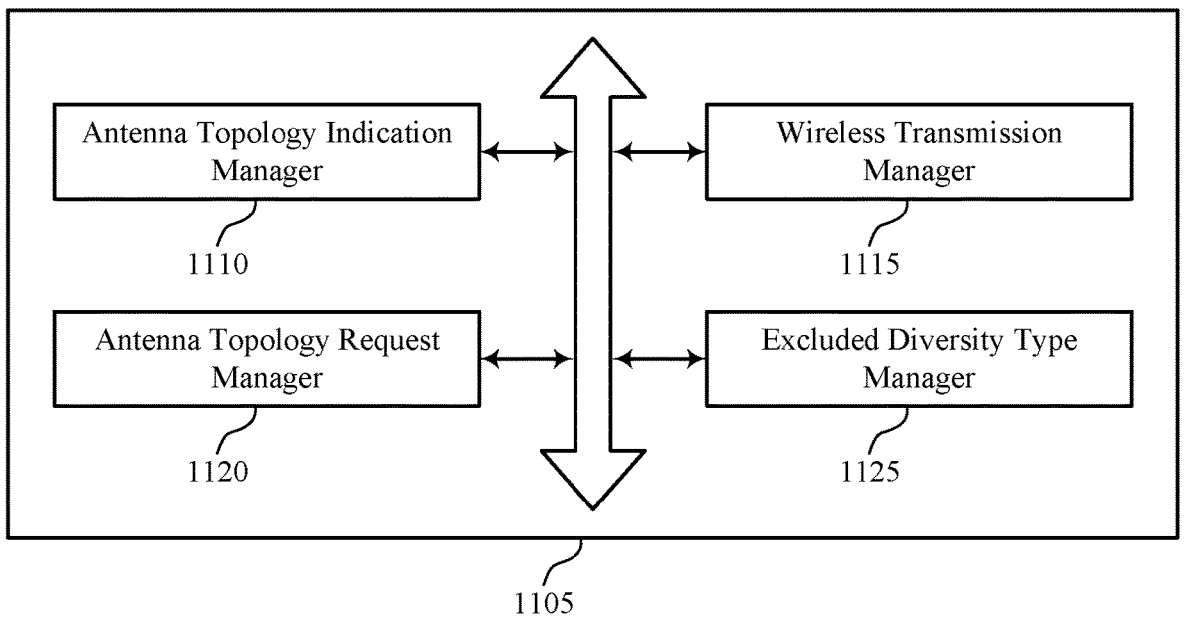
FIG. 11 shows a block diagram of a communications manager that support a network-sensitive transmit diversity scheme in accordance with aspects of the present disclosure.

FIG. 11 shows a block diagram 1100 of a communications manager 1105 that support a network-sensitive transmit diversity scheme in accordance with aspects of the present disclosure. The communications manager 1105 may be an example of aspects of a communications manager 915, a communications manager 1015, or a communications manager 1210 described herein. The communications manager 1105 may include an antenna topology indication manager 1110, a wireless transmission manager 1115, an antenna topology request manager 1120, and an excluded diversity type manager 1125. Each of these modules may communicate, directly or indirectly, with one another (e.g., via one or more buses).

The antenna topology indication manager 1110 may transmit a signal to a transmitting device indicating an antenna topology supported by the receiving device. In some examples, the antenna topology indication manager 1110 may transmit an autonomous transmission that includes the signal indicating the antenna topology. In some cases, the signal indicating the antenna topology includes an indication of at least one of a receive chain count for the receiving device, an available antenna topology supported by the receiving device, or a lack of support by the receiving device for an antenna topology, or a combination thereof. In some cases, the signal indicating the antenna topology includes an indication that the receiving device includes a single-polarization antenna. In some cases, the signal indicating the antenna topology includes an indication that the receiving device lacks a dual-polarization antenna.

The wireless transmission manager 1115 may receive a wireless transmission transmitted by the transmitting device employing a diversity scheme that is supported by the antenna topology. In some examples, receiving the wireless transmission includes receiving a set of concurrent signals. In some cases, the receiving device includes at least one of a base station, a wireless communication system simulator, or a test equipment, or a combination thereof.

The antenna topology request manager 1120 may receive a request signal from the transmitting device requesting the signal indicating the antenna topology, where transmitting the signal indicating the antenna topology is based on the request signal.

The excluded diversity type manager 1125 may implement aspects of the antenna topology not supporting at least one of a frequency diversity, or a multi-polarization diversity, or both, for a set of concurrent wireless transmissions to the receiving device.

Figure 12:
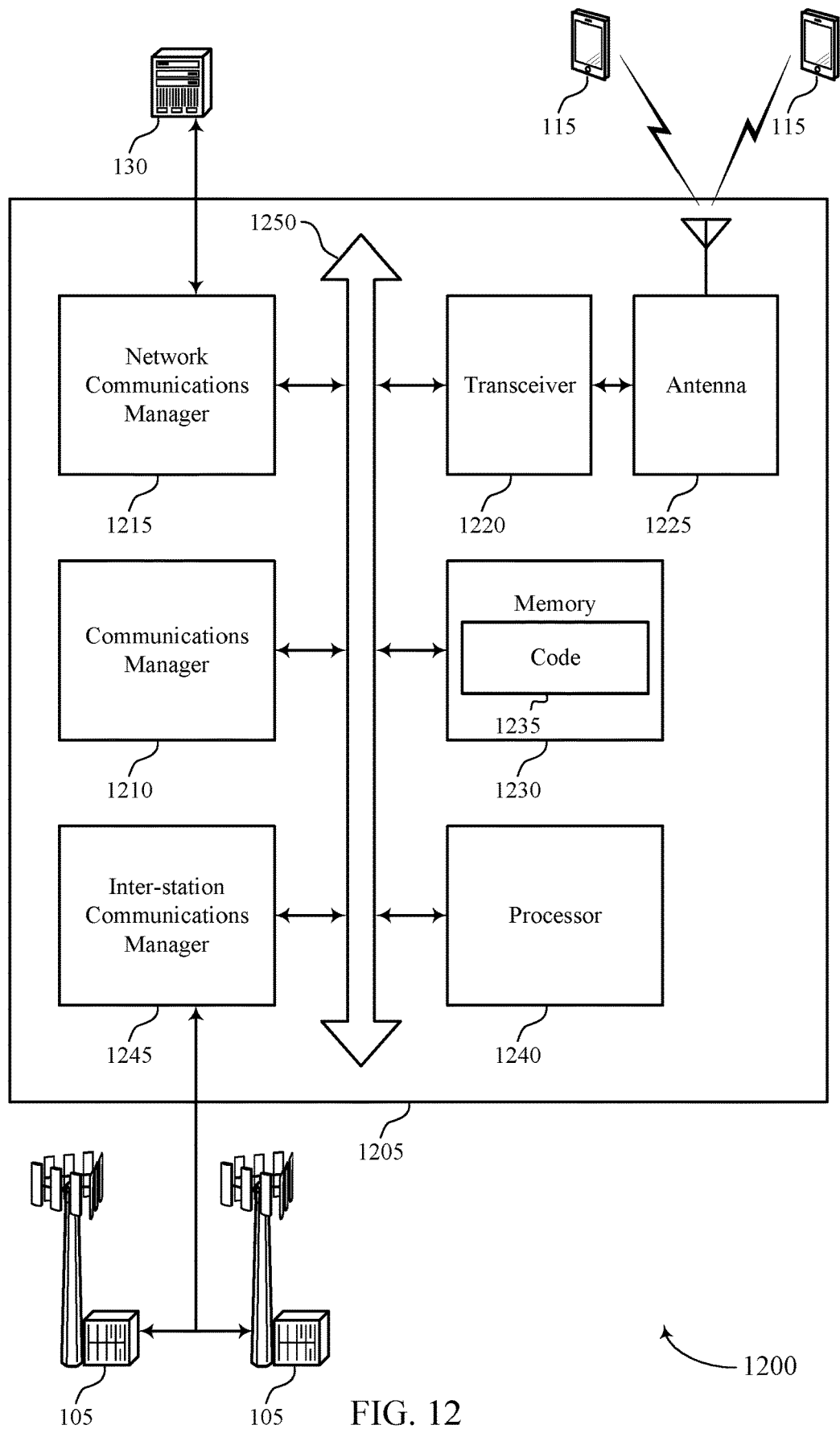
FIG. 12 shows a diagram of a system including a device that support a network-sensitive transmit diversity scheme in accordance with aspects of the present disclosure.

FIG. 12 shows a diagram of a system 1200 including a device 1205 that support a network-sensitive transmit diversity scheme in accordance with aspects of the present disclosure. The device 1205 may be an example of or include the components of device 905, device 1005, or a base station 105, or a receiving device, as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a signal to a transmitting device indicating an antenna topology supported by the receiving device and receive a wireless transmission transmitted by the transmitting device employing a diversity scheme that is supported by the antenna topology.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting network-sensitive transmit diversity scheme).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Beneficially, communications manager 1210 may signal an antenna topology supported by device 1205 to a transmitting device so that the transmitting device may tailor its wireless transmissions to device 1205 in a manner that is responsive to the antenna topology supported by device 1205 thereby assisting transceiver 1220 and associated components of device 1205 to perform effective wireless communications by improving detection and recovery of the information being communicated such that retransmissions or unnecessary transmissions may be avoided.

Figure 13:
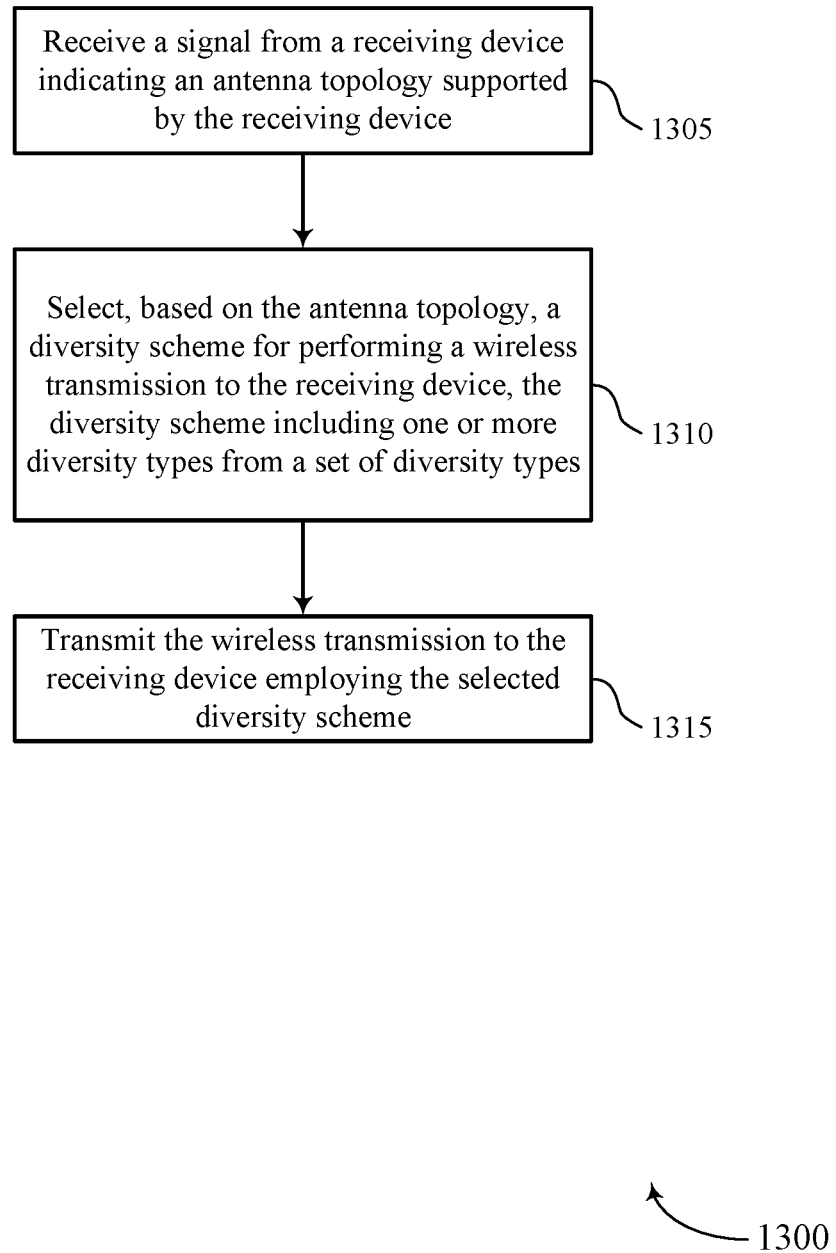
FIGS. 13 through 17 show flowcharts illustrating methods that support a network-sensitive transmit diversity scheme in accordance with aspects of the present disclosure.

FIG. 13 shows a flowchart illustrating a method 1300 that support a network-sensitive transmit diversity scheme in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a signal from a receiving device indicating an antenna topology supported by the receiving device. The operations of 1305 may be performed according to the methods described herein. In some examples, aspects of the operations of 1305 may be performed by an antenna topology indication manager as described with reference to FIGS. 5 through 8. Additionally or alternatively, means for performing 1305 may, but not necessarily, include, for example, antenna 825, transceiver 820, communications manager 810, memory 830 (including code 835), processor 840 and/or bus 845.

At 1310, the UE may select, based on the antenna topology, a diversity scheme for performing a wireless transmission to the receiving device, the diversity scheme including one or more diversity types from a set of diversity types. The operations of 1310 may be performed according to the methods described herein. In some examples, aspects of the operations of 1310 may be performed by a diversity scheme selection manager as described with reference to FIGS. 5 through 8. Additionally or alternatively, means for performing 1310 may, but not necessarily, include, for example, transceiver 820, communications manager 810, memory 830 (including code 835), processor 840 and/or bus 845.

At 1315, the UE may transmit the wireless transmission to the receiving device employing the selected diversity scheme. The operations of 1315 may be performed according to the methods described herein. In some examples, aspects of the operations of 1315 may be performed by a wireless transmission manager as described with reference to FIGS. 5 through 8. Additionally or alternatively, means for performing 1315 may, but not necessarily, include, for example, antenna 825, transceiver 820, communications manager 810, memory 830 (including code 835), processor 840 and/or bus 845.

Figure 14:
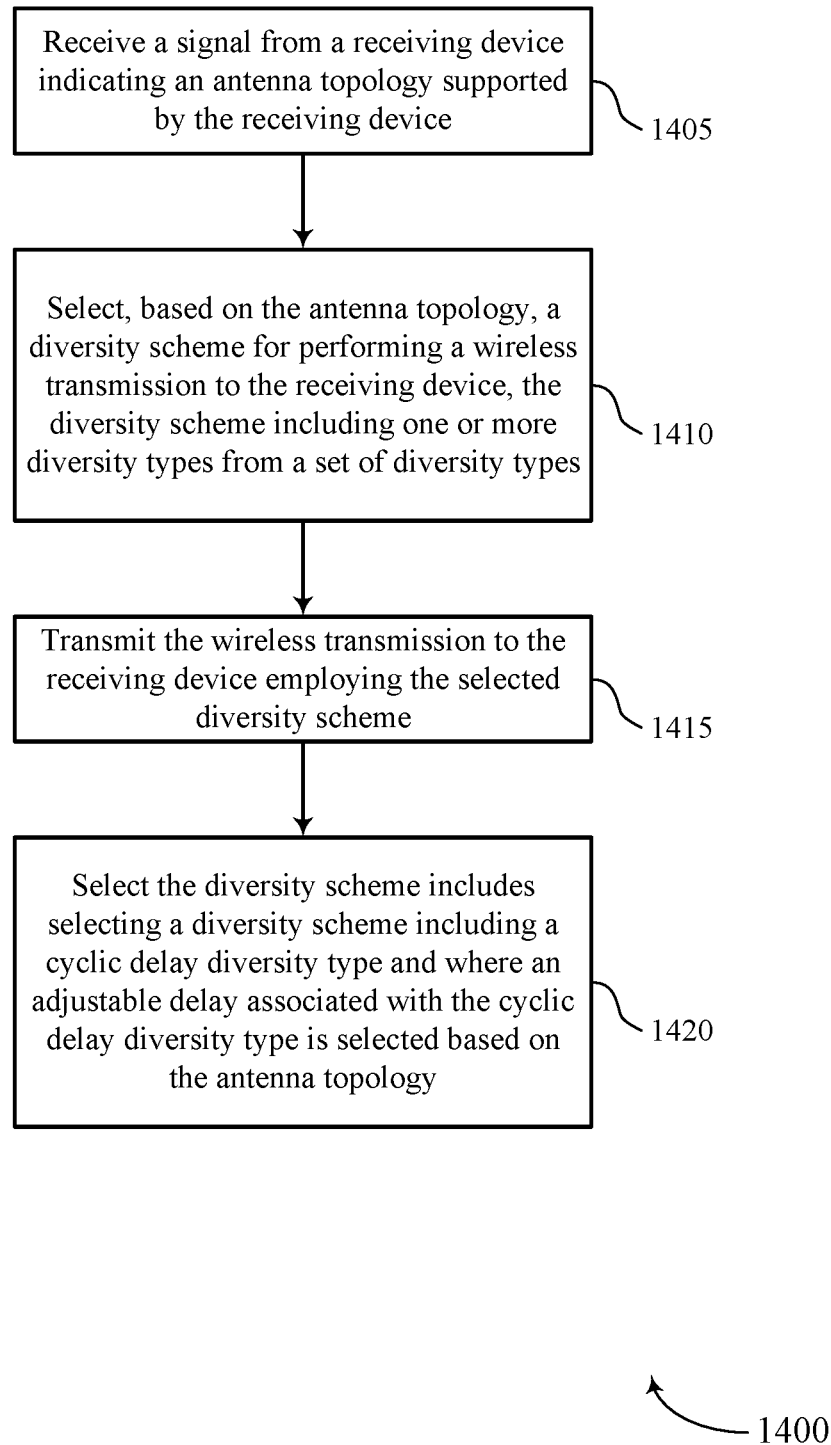

FIG. 14 shows a flowchart illustrating a method 1400 that support a network-sensitive transmit diversity scheme in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a signal from a receiving device indicating an antenna topology supported by the receiving device. The operations of 1405 may be performed according to the methods described herein. In some examples, aspects of the operations of 1405 may be performed by an antenna topology indication manager as described with reference to FIGS. 5 through 8.

At 1410, the UE may select, based on the antenna topology, a diversity scheme for performing a wireless transmission to the receiving device, the diversity scheme including one or more diversity types from a set of diversity types. The operations of 1410 may be performed according to the methods described herein. In some examples, aspects of the operations of 1410 may be performed by a diversity scheme selection manager as described with reference to FIGS. 5 through 8.

At 1415, the UE may transmit the wireless transmission to the receiving device employing the selected diversity scheme. The operations of 1415 may be performed according to the methods described herein. In some examples, aspects of the operations of 1415 may be performed by a wireless transmission manager as described with reference to FIGS. 5 through 8.

At 1420, the UE may select the diversity scheme includes selecting a diversity scheme including a cyclic delay diversity type and where an adjustable delay associated with the cyclic delay diversity type is selected based on the antenna topology. The operations of 1420 may be performed according to the methods described herein. In some examples, aspects of the operations of 1420 may be performed by a CDD manager as described with reference to FIGS. 5 through 8.

Figure 15:
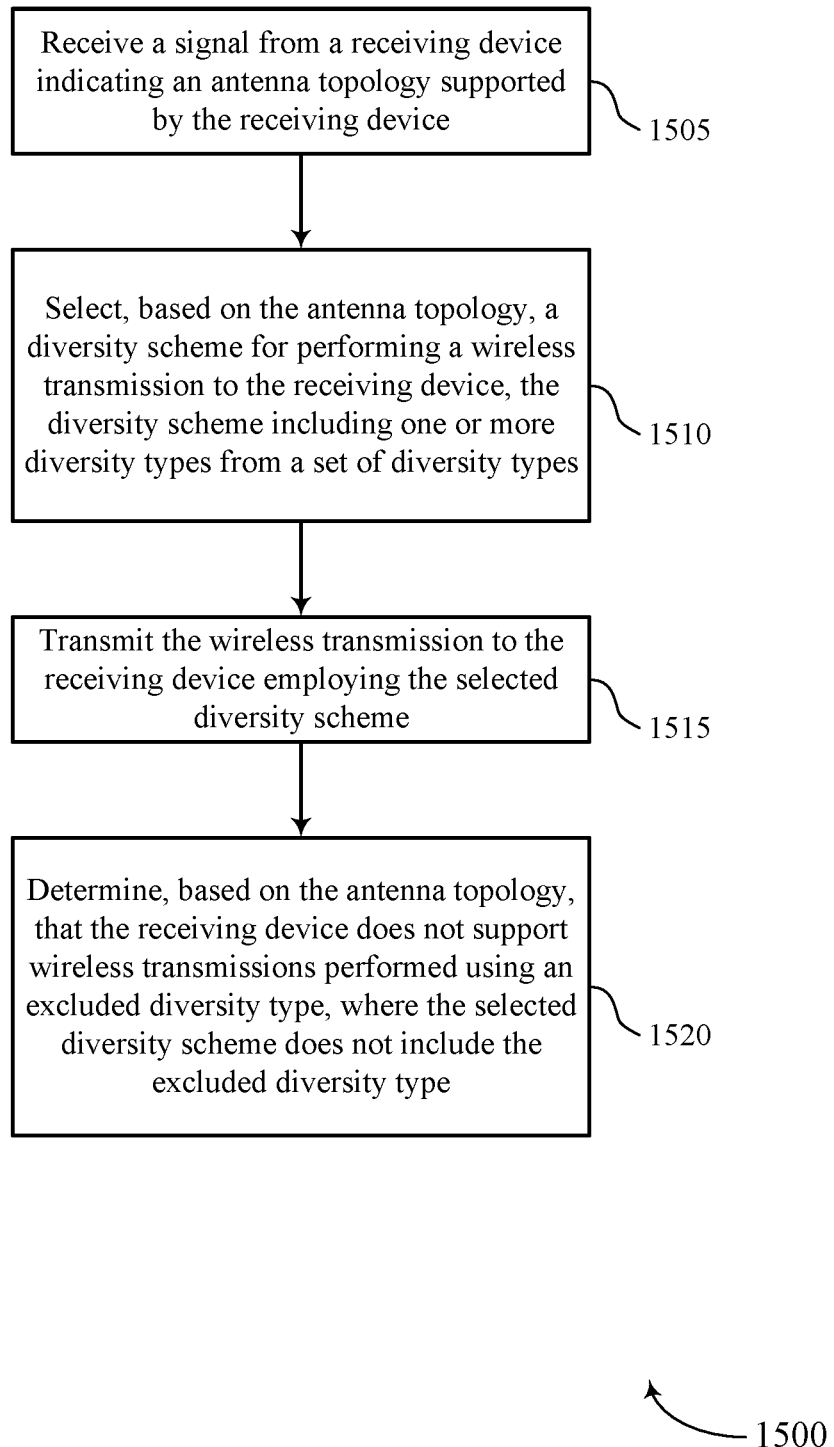

FIG. 15 shows a flowchart illustrating a method 1500 that support a network-sensitive transmit diversity scheme in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a signal from a receiving device indicating an antenna topology supported by the receiving device. The operations of 1505 may be performed according to the methods described herein. In some examples, aspects of the operations of 1505 may be performed by an antenna topology indication manager as described with reference to FIGS. 5 through 8.

At 1510, the UE may select, based on the antenna topology, a diversity scheme for performing a wireless transmission to the receiving device, the diversity scheme including one or more diversity types from a set of diversity types. The operations of 1510 may be performed according to the methods described herein. In some examples, aspects of the operations of 1510 may be performed by a diversity scheme selection manager as described with reference to FIGS. 5 through 8.

At 1515, the UE may transmit the wireless transmission to the receiving device employing the selected diversity scheme. The operations of 1515 may be performed according to the methods described herein. In some examples, aspects of the operations of 1515 may be performed by a wireless transmission manager as described with reference to FIGS. 5 through 8.

At 1520, the UE may determine, based on the antenna topology, that the receiving device does not support wireless transmissions performed using an excluded diversity type, where the selected diversity scheme does not include the excluded diversity type. The operations of 1520 may be performed according to the methods described herein. In some examples, aspects of the operations of 1520 may be performed by an excluded diversity type manager as described with reference to FIGS. 5 through 8.

Figure 16:
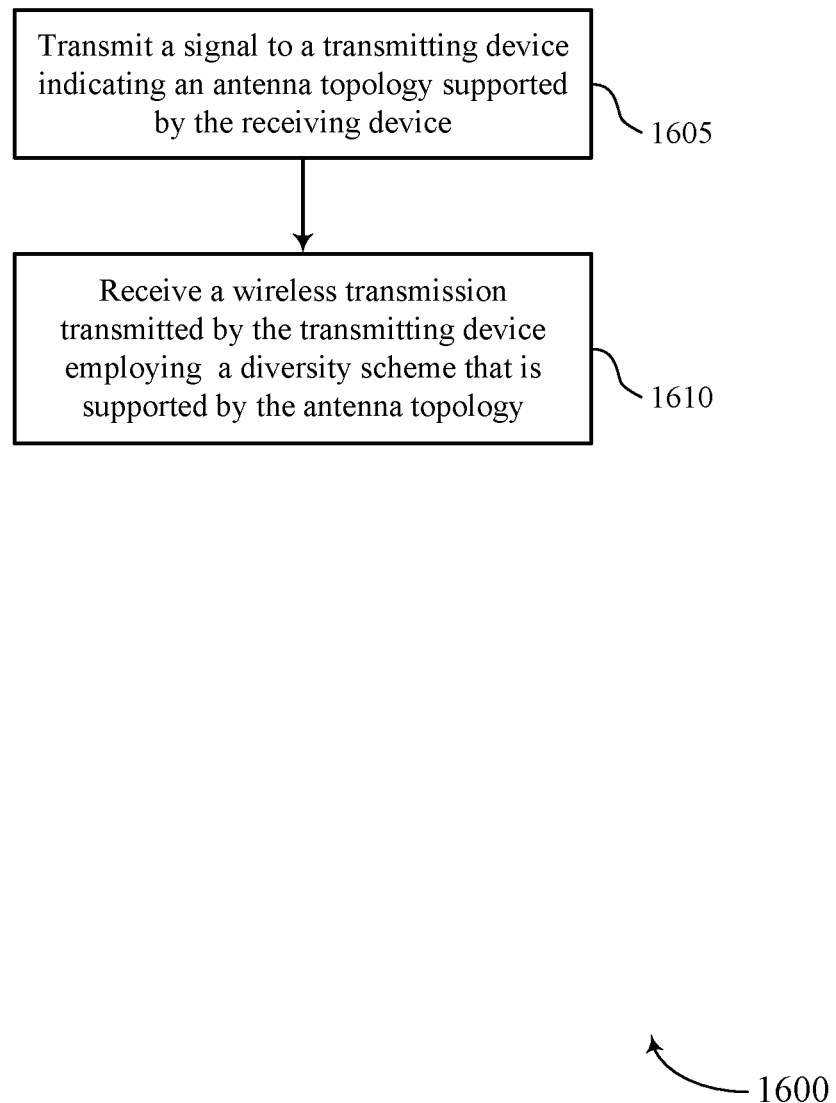

FIG. 16 shows a flowchart illustrating a method 1600 that support a network-sensitive transmit diversity scheme in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a signal to a transmitting device indicating an antenna topology supported by the receiving device. The operations of 1605 may be performed according to the methods described herein. In some examples, aspects of the operations of 1605 may be performed by an antenna topology indication manager as described with reference to FIGS. 9 through 12. Additionally or alternatively, means for performing 1605 may, but not necessarily, include, for example, antenna 1225, transceiver 1220, communications manager 1210, memory 1230 (including code 1235), processor 1240 and/or bus 1250.

At 1610, the base station may receive a wireless transmission transmitted by the transmitting device employing a diversity scheme that is supported by the antenna topology. The operations of 1610 may be performed according to the methods described herein. In some examples, aspects of the operations of 1610 may be performed by a wireless transmission manager as described with reference to FIGS. 9 through 12. Additionally or alternatively, means for performing 1605 may, but not necessarily, include, for example, antenna 1225, transceiver 1220, communications manager 1210, memory 1230 (including code 1235), processor 1240 and/or bus 1250.

Figure 17:
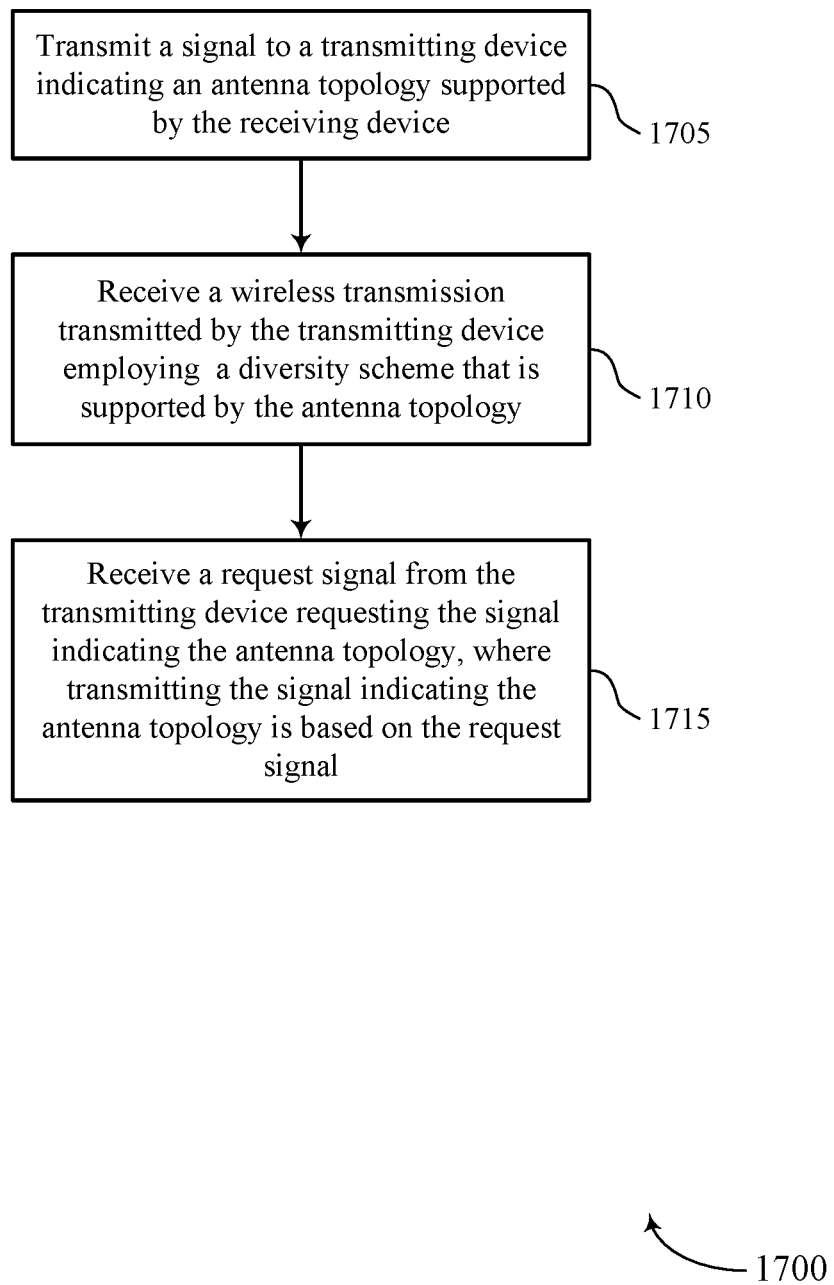

FIG. 17 shows a flowchart illustrating a method 1700 that support a network-sensitive transmit diversity scheme in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit a signal to a transmitting device indicating an antenna topology supported by the receiving device. The operations of 1705 may be performed according to the methods described herein. In some examples, aspects of the operations of 1705 may be performed by an antenna topology indication manager as described with reference to FIGS. 9 through 12.

At 1710, the base station may receive a wireless transmission transmitted by the transmitting device employing a diversity scheme that is supported by the antenna topology. The operations of 1710 may be performed according to the methods described herein. In some examples, aspects of the operations of 1710 may be performed by a wireless transmission manager as described with reference to FIGS. 9 through 12.

At 1715, the base station may receive a request signal from the transmitting device requesting the signal indicating the antenna topology, where transmitting the signal indicating the antenna topology is based on the request signal. The operations of 1715 may be performed according to the methods described herein. In some examples, aspects of the operations of 1715 may be performed by an antenna topology request manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving a signal from a network entity indicating an antenna topology supported by the network entity, wherein the signal indicating the antenna topology comprises at least one of an indication that the network entity comprises a single-polarization antenna or an indication that the network entity lacks a dual-polarization antenna;

selecting, based at least in part on the antenna topology, a diversity scheme for performing a wireless transmission to the network entity, the diversity scheme including one or more diversity types from a plurality of diversity types; and transmitting the wireless transmission to the network entity employing the selected diversity scheme.

2. The method of claim 1, wherein selecting the diversity scheme comprises selecting, based at least in part on the antenna topology, a diversity scheme including a cyclic delay diversity type, and wherein an adjustable delay associated with the cyclic delay diversity type is selected based at least in part on the antenna topology.

3. The method of claim 2, further comprising:

selecting the adjustable delay associated with the cyclic delay diversity type based at least in part on the antenna topology.

4. The method of claim 1, further comprising:

determining, based at least in part on the antenna topology, that the network entity does not support wireless transmissions performed using an excluded diversity type, wherein selecting the diversity scheme comprises selecting, based at least in part on the antenna topology, a diversity scheme different from the excluded diversity type.

5. The method of claim 4, wherein the excluded diversity type comprises at least one of a frequency diversity type or a multi-polarization diversity type.

6. The method of claim 1, wherein the diversity scheme for performing the wireless transmission to the network entity comprises a diversity scheme for transmitting a plurality of concurrent signals, or a diversity scheme for transmitting the wireless transmission using a plurality of transmit chains included in the UE, or both.

7. The method of claim 1, wherein the signal from the network entity indicating the antenna topology supported by the network entity is included in an autonomous transmission from the network entity.

8. The method of claim 1, further comprising:

transmitting a request signal to the network entity requesting the signal from the network entity indicating the antenna topology.

9. The method of claim 1, wherein the signal indicating the antenna topology further comprises an indication of at least one of a receive chain count for the network entity, an available antenna type supported by the network entity, or a lack of support by the network entity for an antenna type.

10. The method of claim 1, wherein the network entity comprises at least one of a base station, or a wireless communication system simulator, or a test equipment.

11. A method for wireless communication at a network entity, comprising:

transmitting a signal to a user equipment (UE) indicating an antenna topology supported by the network entity, wherein the signal indicating the antenna topology comprises at least one of an indication that the network entity comprises a single-polarization antenna or an indication that the network entity lacks a dual-polarization antenna; and receiving a wireless transmission transmitted by the UE employing a diversity scheme that is supported by the antenna topology.

12. The method of claim 11, wherein transmitting the signal to the UE indicating the antenna topology comprises transmitting an autonomous transmission that includes the signal indicating the antenna topology.

13. The method of claim 11, further comprising:
receiving a request signal from the UE requesting the signal indicating the antenna topology,
wherein transmitting the signal to the UE comprises transmitting the signal to the UE indicating the antenna topology supported by the network entity based at least in part on the request signal.

14. The method of claim 11, wherein the antenna topology does not support at least one of a frequency diversity or a multi-polarization diversity, for a plurality of concurrent wireless transmissions to the device network entity.

15. The method of claim 11, wherein the signal indicating the antenna topology further comprises an indication of at least one of a receive chain count for the network entity, an available antenna type supported by the network entity, or a lack of support by the network entity for an antenna type.

16. The method of claim 11, wherein receiving the wireless transmission comprises receiving a plurality of concurrent signals transmitted by the UE.

17. The method of claim 11, wherein the network entity comprises at least one of a base station, a wireless communication system simulator, or a test equipment.

18. An apparatus for wireless communication at a user equipment (UE), comprising:
memory;
a transceiver; and
at least one processor of the UE, the at least one processor coupled with the memory and the transceiver, and the at least one
processor configured to cause the apparatus to:
receive, via the transceiver, a signal from a network entity indicating an antenna topology supported by the network entity, wherein the signal indicating the antenna topology comprises at least one of an indication that the network entity comprises a single-polarization antenna or an indication that the network entity lacks a dual-polarization antenna;
select, based at least in part on the antenna topology, a diversity scheme for performing a wireless transmission to the network entity, the diversity scheme including one or more diversity types from a plurality of diversity types; and
transmit, via the transceiver, the wireless transmission to the network entity employing the selected diversity scheme.

19. The apparatus of claim 18, wherein the at least one processor configured to cause the apparatus to select the diversity scheme is further configured to cause the apparatus to select a diversity scheme including a cyclic delay diversity type, and
wherein an adjustable delay associated with the cyclic delay diversity type is selected based on the antenna topology.

20. The apparatus of claim 19, the at least one processor further configured to cause the apparatus to:

determine, based at least in part on the antenna topology, that the network entity does not support wireless transmissions performed using an excluded diversity type,
wherein the at least one processor configured to cause the apparatus to select the diversity scheme is further configured to cause the apparatus to select, based at least in part on the antenna topology, a diversity scheme different from the excluded diversity type.

21. The apparatus of claim 20, wherein the excluded diversity type comprises at least one of a frequency diversity type or a multi-polarization diversity type.

22. The apparatus of claim 18, wherein the signal from the network entity indicating the antenna topology supported by the network entity is included in an autonomous transmission from the network entity.

23. An apparatus for wireless communication at a network entity, comprising:
memory;
a transceiver; and
at least one processor of the network entity, the at least one processor coupled with the memory and the transceiver, and the at least one processor configured to cause the apparatus to:
transmit, via the transceiver, a signal to a UE indicating an antenna topology supported by the network entity, wherein the signal indicating the antenna topology comprises at least one of an indication that the network entity comprises a single-polarization antenna or an indication that the network entity lacks a dual-polarization antenna; and
receive, via the transceiver, a wireless transmission transmitted by the UE employing a diversity scheme that is supported by the antenna topology.

24. The apparatus of claim 23, wherein the at least one processor configured to cause the apparatus to transmit, via the transceiver, the signal to the UE indicating the antenna topology is further configured to cause the apparatus to transmit, via the transceiver, an autonomous transmission that includes the signal indicating the antenna topology.

25. The apparatus of claim 23, the at least one processor further configured to cause the apparatus to receive, via the transceiver, a request signal from the UE requesting the signal indicating the antenna topology,
wherein the at least one processor configured to cause the apparatus to transmit, via the transceiver, the signal to the UE indicating the antenna topology is further configured to cause the apparatus to transmit, via the transceiver, the signal to the UE indicating the antenna topology supported by the network entity based at least in part on the request signal.

26. The apparatus of claim 23, wherein the antenna topology does not support at least one of a frequency diversity or a multi-polarization diversity for a plurality of concurrent wireless transmissions to the network entity.

27. The apparatus of claim 23, wherein the signal indicating the antenna topology further comprises an indication of at least one of a receive chain count for the network entity, an available antenna type supported by the network entity, or a lack of support by the network entity for an antenna type.

* * * * *